US012751799B2

(12) United States Patent
Youssef

(10) Patent No.: US 12,751,799 B2
(45) Date of Patent: Oct. 6, 2026

(54) HYDRAULIC CONTRAST LIFT SYSTEM PROTOCOL

(71) Applicant: DR. MOHAMED YOUSSEF D.M.D INC., Montreal (CA)

(72) Inventor: Mohamed Youssef, Montreal (CA)

(73) Assignee: DR. MOHAMED YOUSSEF D.M.D INC., Montreal (CA)

( * ) Notice: Subject to any disclaimer, the term of this patent is extended or adjusted under 35 U.S.C. 154(b) by 0 days.

(21) Appl. No.: 19/120,261

(22) PCT Filed: Oct. 3, 2023

(86) PCT No.: PCT/CA2023/051306
§ 371 (c)(1),
(2) Date: Apr. 11, 2025

(87) PCT Pub. No.: WO2024/082047
PCT Pub. Date: Apr. 25, 2024

(65) Prior Publication Data
US 2026/0137489 A1 May 21, 2026

Related U.S. Application Data

(60) Provisional application No. 63/380,305, filed on Oct. 20, 2022.

(51) Int. Cl.
*A61C 8/00* (2006.01)

(52) U.S. Cl.
CPC .................................. *A61C 8/0092* (2013.01)

(58) Field of Classification Search
CPC ...... A61C 8/0033; A61C 8/0037–0045; A61C 8/089–092; A61C 3/02; A61D 7/00
See application file for complete search history.

(56) References Cited

U.S. PATENT DOCUMENTS 4,127,126 A * 11/1978 Schunk ................. A61M 31/00
D24/114
2008/0213729 A1* 9/2008 Hochman ............ A61C 8/0092
433/215
(Continued)

FOREIGN PATENT DOCUMENTS

KR 1020100074860 A 7/2010
WO WO-2009062225 A2 * 5/2009 ......... A61B 17/3472
(Continued)

OTHER PUBLICATIONS

International Search Report dated Dec. 8, 2023 in the corresponding International Patent Application (PCT) No. PCT/CA2023/051306.

*Primary Examiner* — Edelmira Bosques
*Assistant Examiner* — Matthew P Saunders
(74) *Attorney, Agent, or Firm* — Brouillette Legal inc.; Robert Brouillette

(57) ABSTRACT

An apparatus for maxillary sinus mucosa dissection and elevation, in humans or in animals, that lifts said mucosa away from the maxillary bone by injecting a fluid through an osteotomy or a hole in the maxillary bone to create an artificial space between said mucosa and the maxilla, that artificial space is to be subsequently filled with bone substitute or a dental implant or both, this apparatus is used in a new method to determine intra operatively whether the sinus mucosa is successfully lifted, along with the height of the lift, or if it has been perforated.

17 Claims, 22 Drawing Sheets

(56) References Cited

U.S. PATENT DOCUMENTS

| | | | | |
|---|---|---|---|---|
| 2010/0196841 | A1 * | 8/2010 | Nahlieli | A61B 1/07 433/29 |
| 2017/0120021 | A1 | 5/2017 | Krastec | |

FOREIGN PATENT DOCUMENTS

| | | | | | |
|---|---|---|---|---|---|
| WO | 2014062025 | A1 | | 4/2014 | |
| WO | WO-2017115350 | A1 | * | 7/2017 | A61C 8/0092 |

* cited by examiner

HYDRAULIC CONTRAST LIFT SYSTEM PROTOCOL

CROSS-REFERENCE TO RELATED APPLICATIONS

This application claims priority from U.S. application No. 63/380,305 filed on 20 Oct. 2022, the contents of which are hereby incorporated by reference.

FIELD OF THE INVENTION

The present invention generally relates to the field of bone regeneration in the posterior region of the maxilla with the aim to provide adequate space for the application of an autogenous bone graft or other bone substitutes and biomaterials that aid in the eventual placement of dental implants to restore missing dentition when needed in a safe and predictable manner.

BACKGROUND OF THE INVENTION

Loss of teeth and old age are identified as two important factors in relation to maxillary sinus pneumatization and reduced residual maxillary bone. In the posterior maxilla, sinus augmentation was reported for as high as 95% of the implants placed when the residual ridge height was less than 8 mm and around half of the implants placed in that area were associated with a type of sinus floor elevation procedure regardless of the remaining bone height. The first technique described for SFE was the lateral window approach by Tatum and Boyne in 1977 and by James in 1980 using a modified Caldwell-Luc Technique. This approach provides access to the lateral sinus wall by raising a full thickness mucoperiosteal flap from the alveolar crest with vertical releasing incisions. High-speed surgical burs have traditionally been used for preparation of a window in the lateral sinus wall to access the maxillary sinus mucosa. Recently the use of piezoelectric units has been advocated as an alternative to reduce the risk of perforation of the mucosa. Once access is achieved, the mucosa is carefully dissected from the surrounding bone in 3 dimensions using curettes, and a bone graft is placed in the space that has been created. Implants are placed either simultaneously or after the graft has healed. When performing a maxillary sinus augmentation procedure, the most common complication is maxillary sinus mucosa perforation and by preventing this complication, other subsequent sequalae including epistaxis, nasal cavity penetration and maxillary ostium obstruction can be reduced or avoided. Several studies have reported a lower frequency of maxillary sinus mucosa perforation when performing a Transcrestal sinus floor elevation as opposed to the traditional Lateral window sinus floor elevation. In the Transcrestal approach access to the sinus mucosa is provided through the alveolar crest by raising a full thickness flap following a crestal incision or using a tissue punch to expose the alveolar bone then using drills to create a hole through the bone called an osteotomy which can be used to place the implant at the same time of the intervention. The first publication to describe a Transcrestal approach for sinus floor elevation was by Tatum in 1986 where osteotomes were used in direct contact with the sinus mucosa to lift it followed by Summers in 1994 where osteotomes were malleted with the aim to penetrate the sinus floor while displacing a layer of bone within the sinus lumen without perforating the maxillary sinus mucosa. Several techniques were later described as modification of the osteotome original approach such as using a balloon or using hydraulic pressure to lift the maxillary sinus mucosa. Hydraulic sinus floor elevation has been first described in 2005 as a variant of Transcrestal sinus floor elevation that can reduce the incidence of perforation of the maxillary sinus mucosa especially in cases where anatomical restrictions are present. Hydraulic sinus floor elevation was later described as a technique modification used to perform sinus floor elevation through a lateral window approach. The rational for using Hydraulic sinus floor elevation was to apply uniform pressure on the maxillary sinus mucosa during the lift, hence reducing the possibility for its perforation.

A Blind Technique

All the previously discussed variants of Transcrestal sinus floor elevation including the Hydraulic sinus floor elevation are performed, in most part, blindly through a minimal access hole, the Valsalva manoeuvre had been described by several authors to verify the presence of perforations while performing a Transcrestal sinus floor elevation procedure. Another suggested method was to use both the Valsalva manoeuvre along with tactile feedback to feel the elasticity of the mucosa using a depth gauge. Detection of sinus mucosa perforation relying only on such tests intraoperatively can be unreliable and the rate of detection can vary from one clinician to another. This was highlighted in a human cadaver study where the osteotome technique was used and perforations were detected in 6 out of 25 sites (24%) after having removed the lateral nasal wall to inspect the sinus mucosa directly.

Complications Following Transcrestal Sinus Floor Elevation

Two systematic reviews in which most of the studies included used the osteotome technique reported that the most common surgical complication was the maxillary sinus mucosa perforation with an incidence ranging between 0% to 21% and 0% to 26%. In a retrospective study where hydraulic pressure and vibration were used to perform the lift the incidence of detection of sinus mucosa perforation intraoperatively was 3.7% and an additional 5.4% were detected immediately postoperatively by means of a conventional or cone beam CTs where the graft material was noted in the maxillary sinus lumen with a total incidence of 8.9%. Immediate detection of sinus mucosa perforations before the application of a bone substitute material is crucial to avoid the introduction of a foreign body material into the maxillary sinus cavity and unnecessary exposure to radiation from the use of CT or Cone Beam CT scans post operatively when the operator is in doubt that the graft material may have been introduced in the sinus lumen.

Contrast Medium

Radiographic contrast media are classified as positive and negative contrast agents. Positive contrast agents block the passage of x-rays through them more than the soft tissues in the body and hence appear more radiopaque. Positive contrast agents are divided into water soluble and non water soluble groups. The water soluble group is iodine based and the non-water soluble group is made from a suspension of Barium Sulphate. Iodine-based contrast media are compounds containing iodine that are given to patients to enhance the ability to see blood vessels and organs on radiographs or CT scans. These images provide greater detail when necessary to help health care professionals diagnose potential problems. They are divided into 4 groups: high-osmolar ionic monomers, low-osmolar ionic dimers, low-osmolar non-ionic monomers, iso-osmolar non-ionic dimers. Non ionic low-osmolar contrast media have lower adverse effects and toxicity compared to high-osmolar ionic agents. Traditional uses of Iodine based contrast media include being injected into veins or arteries, within the disks or the fluid spaces of the spine, and into other body cavities, they can be given orally as a drink, or rectally.

Summary of the Prior Art

The patent WO2014062025A1 is an example of prior art being currently used to achieve hydraulic sinus floor elevation.

The shortcomings of the prior art include:

a. Trancrestal sinus floor elevation techniques and more specifically the Hydraulic sinus floor elevation is associated with less complications compared to Lateral window technique but is considered as a blind technique and fails to provide the operator with a clear objective sign of the successful detachment and lifting of the maxillary sinus mucosa from the boney floor of the maxillary sinus relying mainly on tactile feedback and requiring a steep learning curve.

b. With the current techniques using Hydraulic sinus floor elevation there is a possibility that a tear in the sinus mucosa is detected following the application of the bone graft leading to the introduction of graft material into the sinus lumen with potential to cause further complication and possibly requiring further surgical intervention to correct them.

c. The prior art uses mainly saline as the medium for dissection of the sinus mucosa from the maxillary bone, which is not radio opaque.

d. Prior art provides a single size single shape working end/injection member that is divided into a body portion and an insertion portion, the body has a ribbed parallel sided cylindrical configuration, and the insertion portion is made of a relatively short cone with high taper and a step between both portions to seal the osteotomy. It does not allow a self maintained friction fit and requires that the injection member be held in place firmly by hand or with a surgical instrument the whole time while delivering or injecting the fluid otherwise the seal is broken, and the sinus mucosa will not be lifted.

e. The metallic connector connecting the fluid supply tube to the injection member has a short front connection portion causing a portion of the body of the injection member not being properly supported from the inside leading to bending and kinking of the injection member while applying the desired pressure to achieve the seal of the osteotomy while injecting which compromises or stops the flow of the saline.

f. In the prior art, since the operator must press the injection member using the fingers or using a surgical instrument so that the injection member is in close contact with the osteotomy, in order to control the pressure and direction of the water for dissecting and elevating the maxillary sinus mucosa of the desired part. This makes the process inconvenient for the operator because both the patency of the injection member and the seal with the bone wall of the osteotomy relies mainly on the amount and the direction of pressure exerted by the operator's hand while holding it making it harder to concentrate on other aspects of the procedure like controlling the injection pressure and rate of the fluid/saline.

g. In the prior art resistance while injecting could be contributed to two possible reasons, either the operator is exerting too much pressure kinking the injection member or the osteotomy is not deep enough hence not providing access to the sinus mucosa making it harder for the operator to diagnose the real cause and correct it.

h. In current techniques a regular syringe is used to inject the fluid, those graduated stock syringes provide only visual feedback as to how much fluid has been inserted under the sinus mucosa requiring the visual attention of the operator instead of being focused on the surgical field.

i. Also, a stock syringe does not allow good control of the amount of pressure applied and can lead to an undesirably high volume injected if a slightly higher digital pressure is applied on the plunger.

j. The current techniques do not provide a visible confirmation to the operator that the sinus mucosa has been lifted away from the maxillary sinus floor enough for the intended or planned use specific to the clinical scenario i.e., enough vertical height for the placement of a specific implant length.

k. The prior art does not allow use for more extensive sinus lift on the same side of the maxilla since it is complicated to keep the space created between the maxillary sinus mucosa and the maxillary bone sealed if more than one osteotomy is present, once the mucosa portion corresponding to the initial osteotomy is lifted trying to inject fluid through a subsequent adjacent new osteotomy would push the fluid through the initial osteotomy instead of allowing the pressure build up under the maxillary sinus mucosa to allow its lifting in the area corresponding to the subsequent osteotomy.

SUMMARY OF THE INVENTION

An improved hydraulic sinus lift apparatus would be able to achieve all or some of the following goals:

1. Have a working end that can be self retained within the osteotomy throughout the injection process or whenever needed freeing the operator's hand.
2. Said end would provide excellent sealing ability to ensure the injected fluid is directed towards the maxillary sinus mucosa and not leaking into the oral cavity, that excellent seal would also allow the operator to determine if the sinus floor has not yet been penetrated when there is high resistance while injecting.
3. Also, the working end should be able to remain patent and not kink or block the fluid's flow during injection, the working end should be versatile i.e. supplied in different sizes to fit different sizes of osteotomies in different clinical scenarios or be adjustable.
4. Such apparatus should allow use in the scenario of a single missing posterior tooth or multiple missing posterior teeth.
5. It should have a simple and intuitive design that is easy to use and does not add a great amount of work or steps that would greatly increase operating time.
6. The syringe used to supply the fluid should allow the operator's focus to be on the operated site rather than the syringe itself.
7. Using it should provide the operator with an objective sign when the sinus mucosa is successfully lifted as well as when said mucosa has been perforated prior to the application of a bone substitute.
8. Allow the operator to estimate the true height of sinus membrane elevation.

The main aspects and advantages of this invention include but are not limited to the following points, it achieves all the previously mentioned goals through some or all of the following:

a. Using water soluble iodine based contrast media instead of saline to dissect the maxillary sinus mucosa from the maxillary bone but can also be used with any injectable positive contrast agent or any other fluid. Those compounds have a viscosity ranging from 2 to 22 cP at room temperature and 1.5 to 12 at body temperature, this allows the flow rate of the injected fluid to be reduced depending on the anticipated thickness of the sinus mucosa while still being fluid enough to conform to the shape of the sinus floor if the sinus mucosa is perforated and to be easily retrievable when suctioned out through the osteotomy.
b. When used with such compounds it allows the detection of maxillary sinus mucosa tears/perforations intraoperatively by way of intra operative radiographs.
c. Provides an objective sign of successful sinus mucosa dissection and lifting intraoperatively by way of intra operative radiographs.
d. Leaves no room for doubt prior to the application of any bone graft material or prior to implant placement.
e. Confirms the desired liquid's volume has indeed been fully injected where it should be injected between the maxillary sinus mucosa and the sinus floor since the retentive end seals completely the osteotomy any increase or decrease in the volume of injected compounds by way of further injection or suction using a specifically designed syringe can be detected as increase or decrease in size of a radiopaque entity on subsequent radiographs.
f. This invention provides a plurality of conical retentive ends made of a soft and deformable medical grade silicone comprising a series of exchangeable ends that fit on a hard injection stent, these retentive ends all have a similar low taper but differing diameters to tightly fit into different sizes of different osteotomies.
g. The friction fit of the retentive end inside the osteotomy prevents the liquid from flowing out of the created space between the sinus mucosa and the sinus floor unless the working end is pulled out of the osteotomy site.
h. The taper on a retentive end can allow the same working end to fit different sizes of osteotomies provided it is advanced deeper into said osteotomy since its diameter increases steadily from top to bottom.
i. The series of exchangeable retentive ends have a diameter at the front closely corresponding to the previously used drill to create the osteotomy to always ensure a snug friction fit that does not require maintained pressure to keep in place during the injection process following its insertion.
j. The series of exchangeable retentive ends have radioopaque markings a predetermined distance such as 1 mm apart to be able to allow the operator to estimate height on a periapical radiograph taking into consideration possible radiographic distortion.
k. A click syringe used in this embodiment allows the operator to concentrate on the surgical field while injecting, this syringe has a trioval cross sectional shape to prevent rotation of the plunger inside the barrel but can have a square oval or a rectangular oval shapes in other embodiments, one of the sides of the plunger has pyramidal shaped protrusions that fit against a corresponding indentation in a protruding base on the inside surface of the barrel giving a click with each predetermine volume such as 0.5 mL of fluid injected, while allowing the plunger to move in both directions inward and outward to inject or to suction, that click provides auditory and tactile feedback that allows the operator to keep track of the injected volume without looking at the syringe.
l. The click syringe design also allows for close control on the amount of fluid injected since it provides a soft stop with each click of the plunger against the barrel.
m. The hollow injection stent can be made from metal or a polymer and has a longer upper end that snugly fits into the soft retentive end just shy of its tip providing proper support and preventing bending or kinking ensuring the steady flow of the contrast medium without compromising the quality of the seal of the osteotomy.
n. An alternative option is provided by way of using an expanding injection stent that is composed of at least two hollow elements; an inner element connected to the tube and an outer element connected to the retentive end, the inner element is a hollow cylinder that has an upper end with an externally threaded head and a body surrounded by at least one hydraulic piston seal made of softer material, and a lower end with at least one external retentive feature to hold the tube, both ends are separated by a wider base perpendicular to the inner element's long axis; the outer element is a hollow cylinder that has only an upper end and a wide base, the upper half of the upper end of the outer element has a progressively narrowing lumen and is internally threaded, it has at least three vertical cuts along its long axis going through its surface connecting the outer surface to the lumen to impart flexibility for expansion, those cuts do not go all the way to its base, the threaded head of the inner element has a diameter that fits into the lumen of the outer element and can be screwed therein in such a manner that if the inner element is advanced when screwing it into the outer element by turning the inner element's base clockwise, it will cause the upper element's circumference to increase consequently increasing the circumference of the upper part of the soft retentive end stretching it to have outer parallel walls on its upper one third, the hydraulic piston seal on the inner element seals both lumens from the outer environment and avoid spilling of the injected fluid, this embodiment allows for an even tighter fit if desired once the working end is inserted into the osteotomy.
o. Includes multiple components of different diameters that can act as conical plugs to plug existing osteotomies and allow the injection pressure to be maintained and directed to the sinus mucosa when a subsequent osteotomy is added on the same side of the maxilla for multiple osteotomy sites and allow maxillary sinus mucosa dissection and lifting in those sites during the same surgical intervention that would allow for a more extensive sinus floor elevation using a less invasive technique.
p. The components of that kit can be used in both Crestal and Lateral window approaches.
q. Allows a faster Sinus floor elevation procedure compared to existing techniques and reduces post operative sequelae and complications.
r. Greatly reduces the need for post operative confirmation with a Cone Beam CT scan.

Other and further aspects and advantages of the present invention will be obvious upon understanding of the illustrative embodiments about to be described or will be indicated in appended claims, and various advantages not referred to herein will occur to one skilled in art upon employment of the invention in practice.

BRIEF DESCRIPTION OF THE DRAWINGS AND RADIOGRAPHS

The above and other aspects, features and advantages of the invention will become more readily apparent from the following description, reference being made to the accompanying drawings in which.

Figure 21:
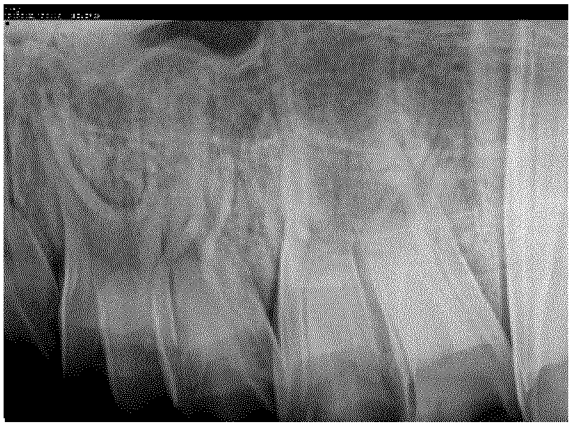
Figure 22:
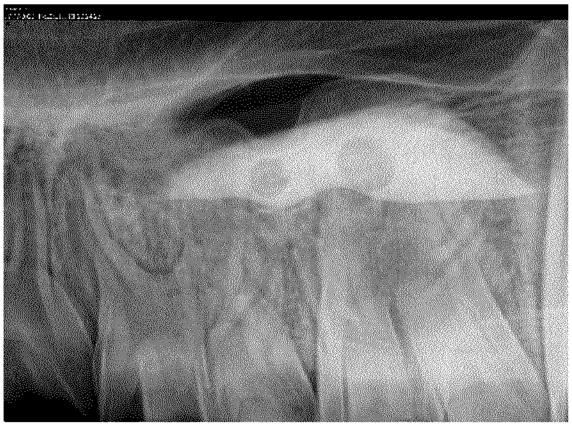
Figure 23:
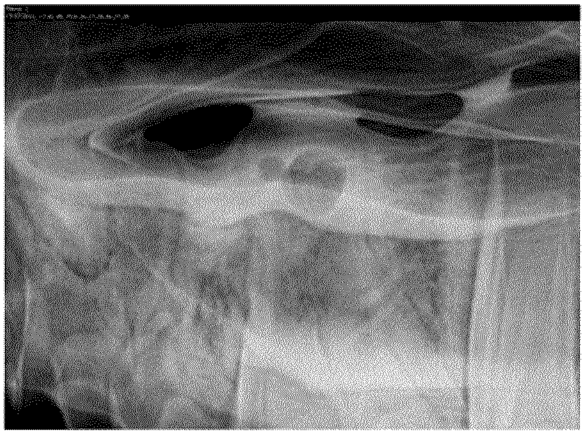

FIGS. 21 through 23 are radiographs of a sheep head showing the left maxillary sinus and posterior teeth, FIG. 21 is the preoperative radiograph, FIG. 22 shows the typical ballooning effect seen when the contrast medium has successfully dissected and lifted the maxillary sinus mucosa whereas the radiograph in FIG. 23 was taken after an artificial perforation had been created and the contrast medium injected shows how the contrast medium follows the shape of the sinus floor and anterior wall with no ballooning and a more diffuse radio opacity.

Figure 24:
Figure 25:
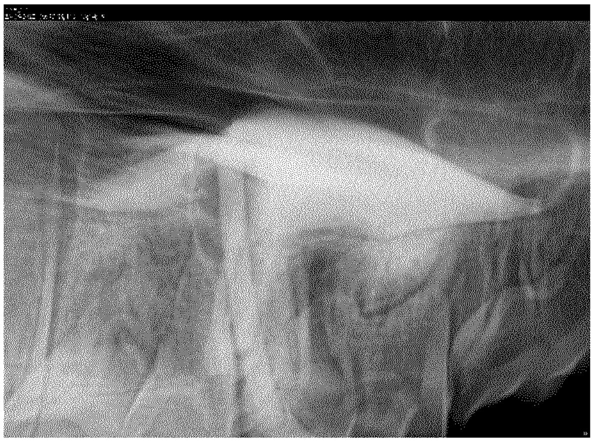
Figure 26:
Figure 27:
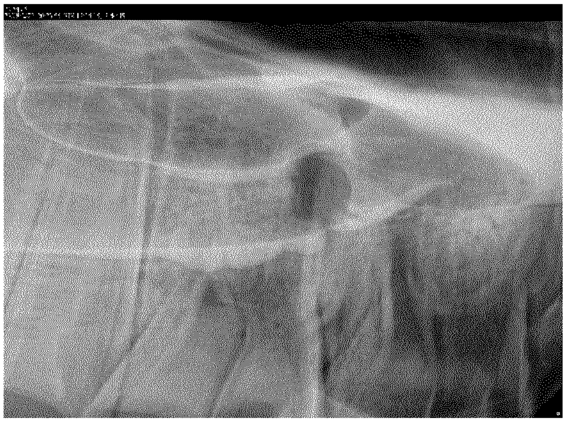

FIGS. 24 through 27 are radiographs of a different head and show the right maxillary sinus and posterior teeth, FIG. 24 is the preoperative radiograph, FIG. 25 shows a successful lift while the retentive end/injection stent assembly were still plugging the osteotomy, FIG. 26 shows the same lifted membrane with the conical plug sealing the osteotomy and FIG. 27 is the post perforation radiograph where more diffuse radio opacity is seen and the contrast medium is stagnating against the anterior wall of the sinus since the head was tilted forward.

DETAILED DESCRIPTION OF A PREFERRED EMBODIMENT

A novel Hydraulic Contrast Lift System and Protocol will be described hereinafter. Although the invention is described in terms of specific illustrative embodiments, it is to be understood that the embodiments described herein are by way of example only and that the scope of the invention is not intended to be limited thereby.

In the following description, similar features in the drawings have been given similar reference numerals, and in order not to weigh down the figures, some elements are not referred to in some figures if they were already identified in another figure.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise' and "comprises"), "having" (and any form of having, such as "have and "has"), "including" (and any form of including, such as "include and "includes") or "containing" (and any form of containing, such as "contain" and "contains"), are inclusive or open-ended and do not exclude additional, unrecited elements.

As used herein the word "essentially" means "mostly, but not exclusively".

It is also to be understood that the word "about" or "approximately" means an acceptable error for a particular value as determined by one of ordinary skill in the art, which depends in part on how the value is measured or determined. Insofar as it refers to percentages in the specification and claims, it means rounding up or down to the nearest whole number percentage. Insofar as it refers to other numbers in the specification and claims, it means plus or minus 10%.

For purposes of this specification and the appended claims, unless otherwise indicated, all numbers, material percentages or ratios, reaction conditions, and other numerical values are also to be understood as modified by the term "about" in all cases.

Accordingly, unless indicated to the contrary, the numerical parameters set forth in the following specification and appended claims are approximations that may vary depending on the desired properties sought to be obtained. Without attempting to limit the application of the doctrine of equivalents to the claims, at a minimum each numerical parameter should be interpreted in light of the reported number of significant figures and by applying normal rounding techniques.

Figure 1:
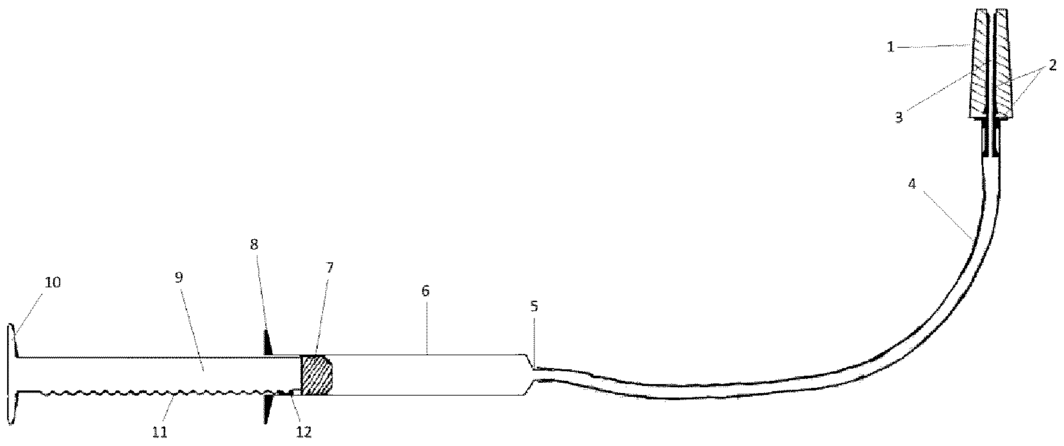
FIG. 1 is a cross sectional illustration of an apparatus for maxillary sinus mucosa dissection and elevation, in accordance with this invention.
Figure 2:
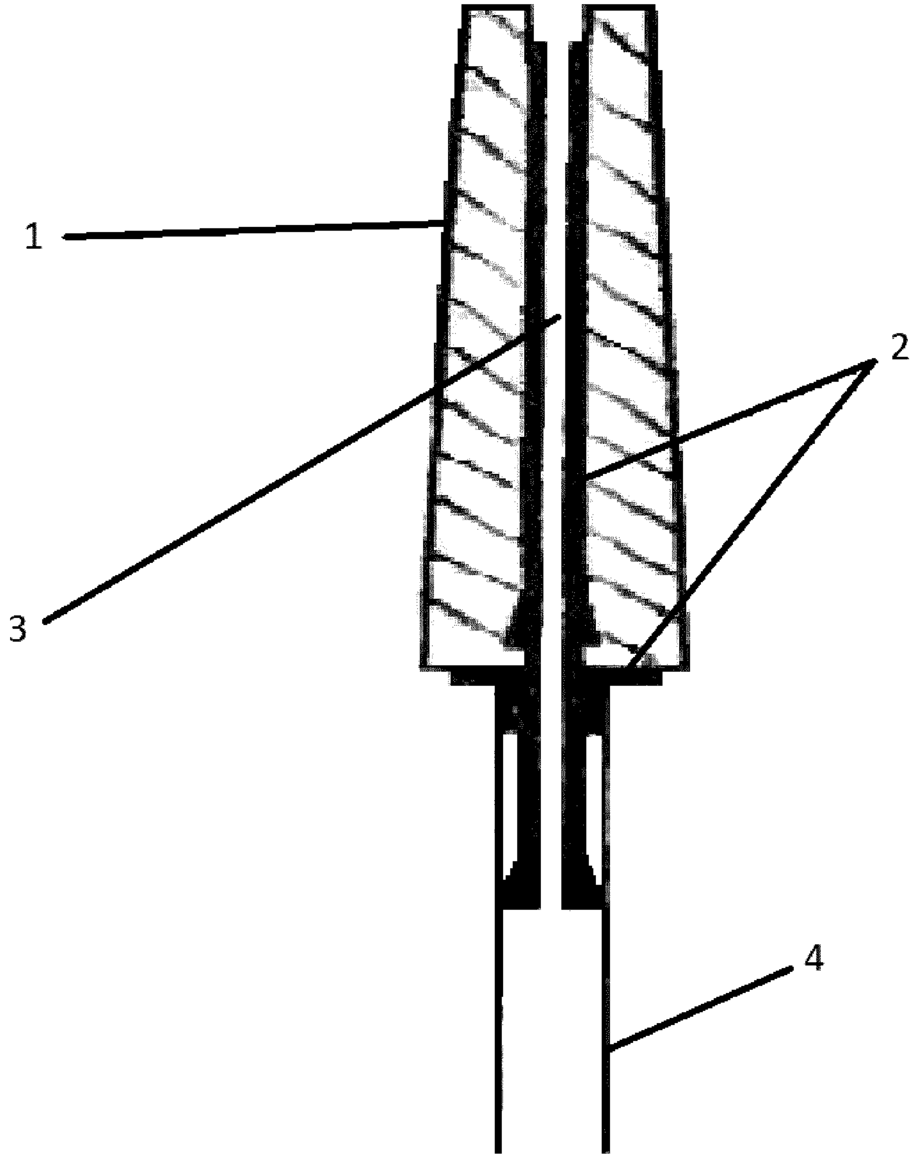
FIG. 2 is a cross sectional illustration of the retentive end/injection stent assembly of FIG. 1 connected to the tube.

FIG. 1 shows a cross sectional illustration of an apparatus for maxillary sinus mucosa dissection and elevation, in humans or in animals, that lifts the said mucosa away from the maxillary bone by injecting a fluid through an osteotomy or a hole in the maxillary bone to create an artificial space between said mucosa and the maxilla according to an embodiment of the present invention. That artificial space is to be subsequently filled with bone substitute or a dental implant or both. Element 1 denotes a retentive end that provide retention for an injection stent 2 within the osteotomy and seal it from the oral environment, 3 refers to the lumen of the said stent which connected to a click syringe through a tube 4, the click syringe is composed of a plunger 9 with a thumb rest 10 that fits snugly into a barrel 6, a seal 7 on the upper end of the plunger, a barrel flange 8, and a tip 5 on the upper end of the barrel, the plunger has several pyramidal steps 11 along one of its sides that fit into a corresponding pyramidal indentation on protruded base 12 from the barrel's wall. FIG. 2 shows a cross sectional illustration of the retentive end/injection stent assembly connected to the tube.

In an embodiment of the invention, there is provided a plurality of interchangeable retentive ends that provide retention for an injection stent within the osteotomy and seal it from the oral environment, they are deformable, conical in shape with a low taper and the circumference of a given retentive end's cross section gradually increasing from its upper ends to its lower end, they are hollow to fit around the injection stent, they are made in different sizes so that the diameter of the cross section of the upper end closely matches those of different drilling systems that create the osteotomies, this design allows friction fit, maintained retention and maintained seal of the said retentive ends upon being inserted into any size of osteotomy.

In the same embodiment of the invention, there is provided a hollow injection stent that allows the flow of the contrast medium towards the maxillary sinus mucosa while supporting the retentive end to prevent its bending and that can be connected to a syringe through a tube, it is a hollow cylinder that is made of a hard material, a metal or a polymer, its upper end is longer in comparison to its lower end, the upper end's height closely corresponds to that of the retentive ends, the upper and lower ends are separated with a base perpendicular to the long axis of the injection stent and has a larger circumference than both ends to support the retentive end while being pressed into the osteotomy, the upper end has at least one retentive feature to secure the retentive end around it while being used and the lower end has at least one retentive feature to secure the tube in place.

FIG. 2 is cross sectional illustration of the retentive end/injection stent assembly connected to the tube.

In another embodiment of the invention, there is provided a hollow expanding injection stent that can be used interchangeably with the regular injection stent and has the same function as said stent plus allowing the operator to control the amount of retention into the osteotomy by expanding the retention end from within, this stent can also be connected to a syringe through a tube, it is composed of at least two hollow elements; an inner element connected to the tube and an outer element connected to the retentive end, the inner element is a hollow cylinder that has an upper end with an externally threaded head and a body surrounded by at least one hydraulic piston seal made of softer material, and a lower end with at least one external retentive feature to hold the tube, both ends are separated by a wider base perpendicular to the inner element's long axis; the outer element is a hollow cylinder that has only an upper end and a wide base, the upper half of the upper end of the outer element has a progressively narrowing lumen and is internally threaded, it has at least three vertical cuts along its long axis going through its surface connecting the outer surface to the lumen to impart flexibility for expansion, those cuts do not go all the way to its base, the threaded head of the inner element has a diameter that fits into the lumen of the outer element and can be screwed therein in such a manner that if the inner element is advanced when screwing it into the outer element by turning the inner element's base clockwise, it will cause the upper element's circumference to increase consequently increasing the circumference of the upper part of the soft retentive end stretching it to have outer parallel walls on its upper one third, the hydraulic piston seal on the inner element seals both lumens from the outer environment and avoid spilling of the injected fluid, this embodiment allows for an even tighter fit if desired once the working end is inserted into the osteotomy.

Figure 7:
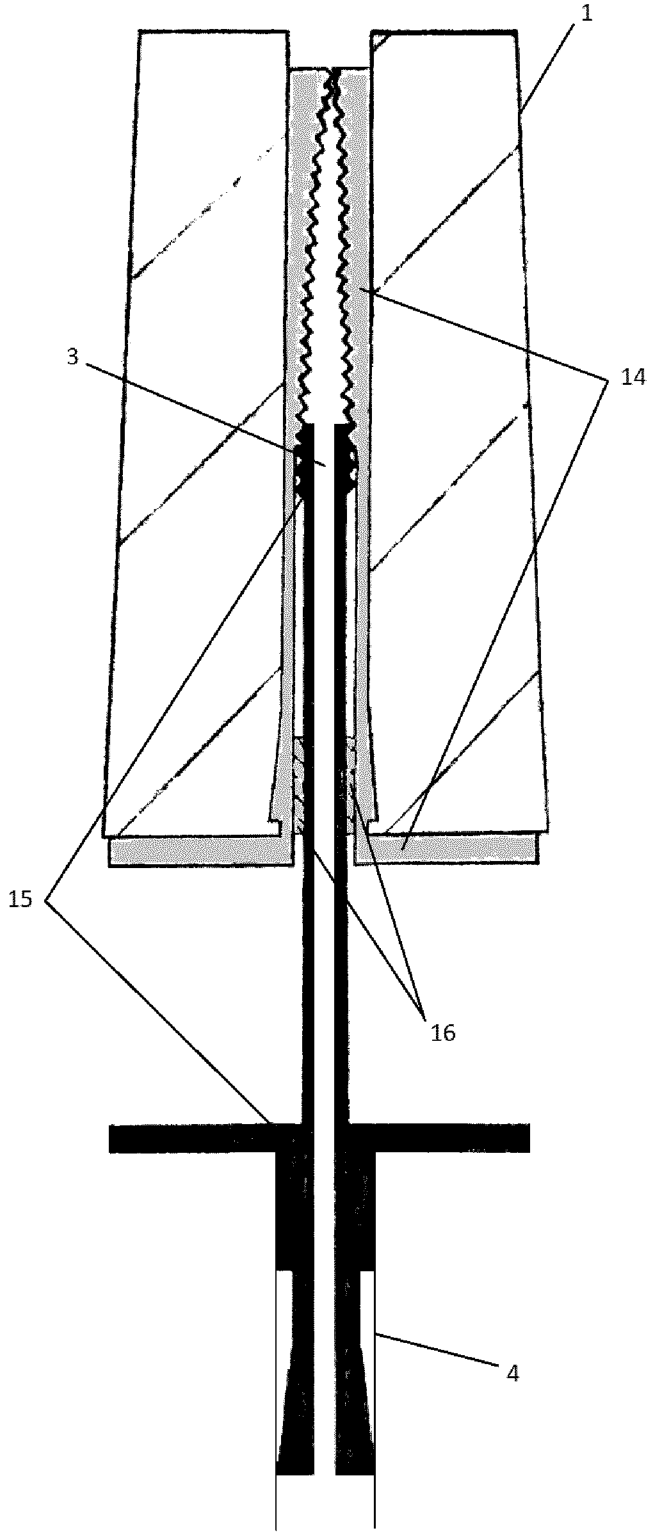
FIG. 7 is a cross sectional illustration of the retentive end assembled with an expanding injection stent.

FIG. 7 is cross sectional illustration of the retentive end assembled with an expanding injection stent composed of an inner element 15 connected to the tube and an outer element 14 surrounded by the retentive end, the inner element is a hollow cylinder that has an upper end with an externally threaded head and a body surrounded by at least one hydraulic piston seal 16 made of softer material, and a lower end with at least one external retentive feature to hold the tube, both ends are separated by a wide base, the outer element is a hollow cylinder that has only an upper end and a wide base, the upper half of the upper end of the outer element has a progressively narrowing lumen and is internally threaded.

Figure 8:
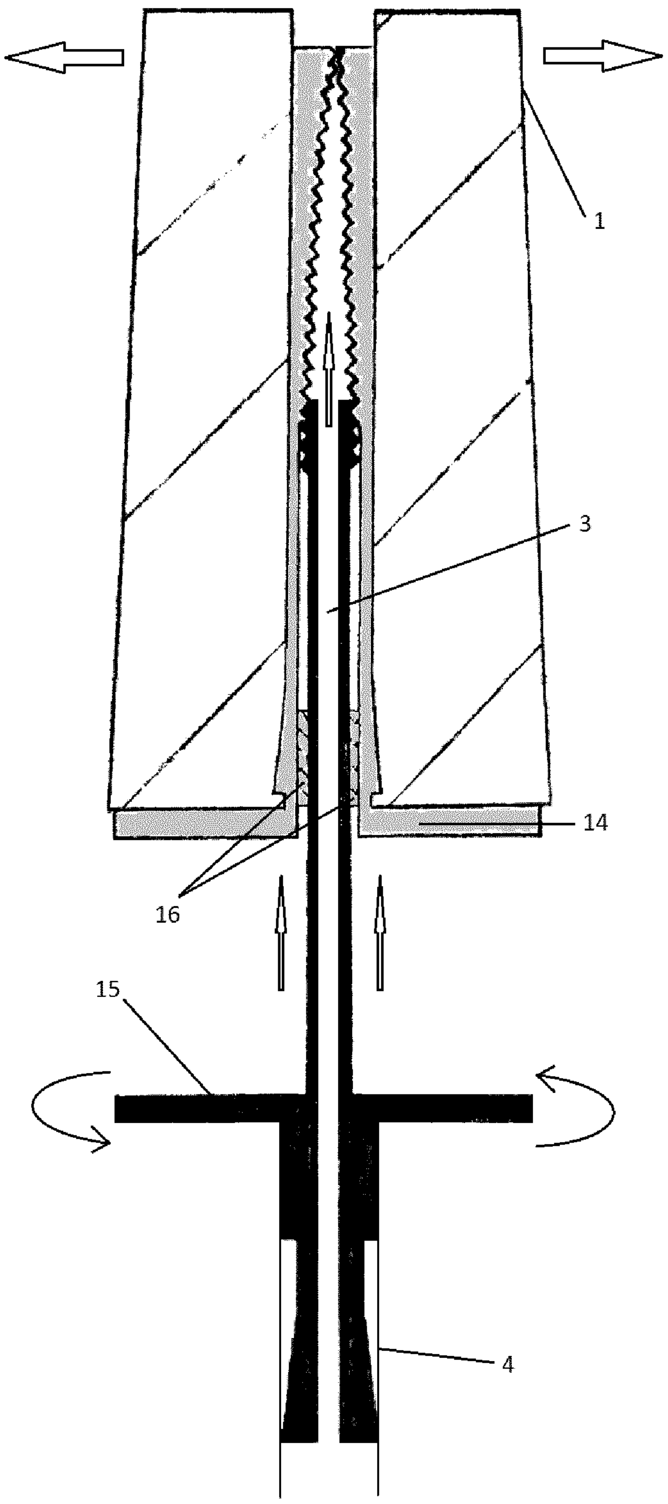
FIG. 8 shows the same cross section as in FIG. 7 with the arrows explaining the effect of turning the inner element clockwise on the upward movement of said element into the outer element and the lateral expansion of the upper portion of the walls of the outer element in turn pushing and expanding the walls of the retentive end.

FIG. 8 shows the same cross section as in FIG. 7 with the arrows explaining the effect of turning the inner element clockwise on the upward movement of said element into the outer element and the lateral expansion of the upper portion of the walls of the outer element in turn pushing and expanding the walls of the retentive end.

Figure 9:
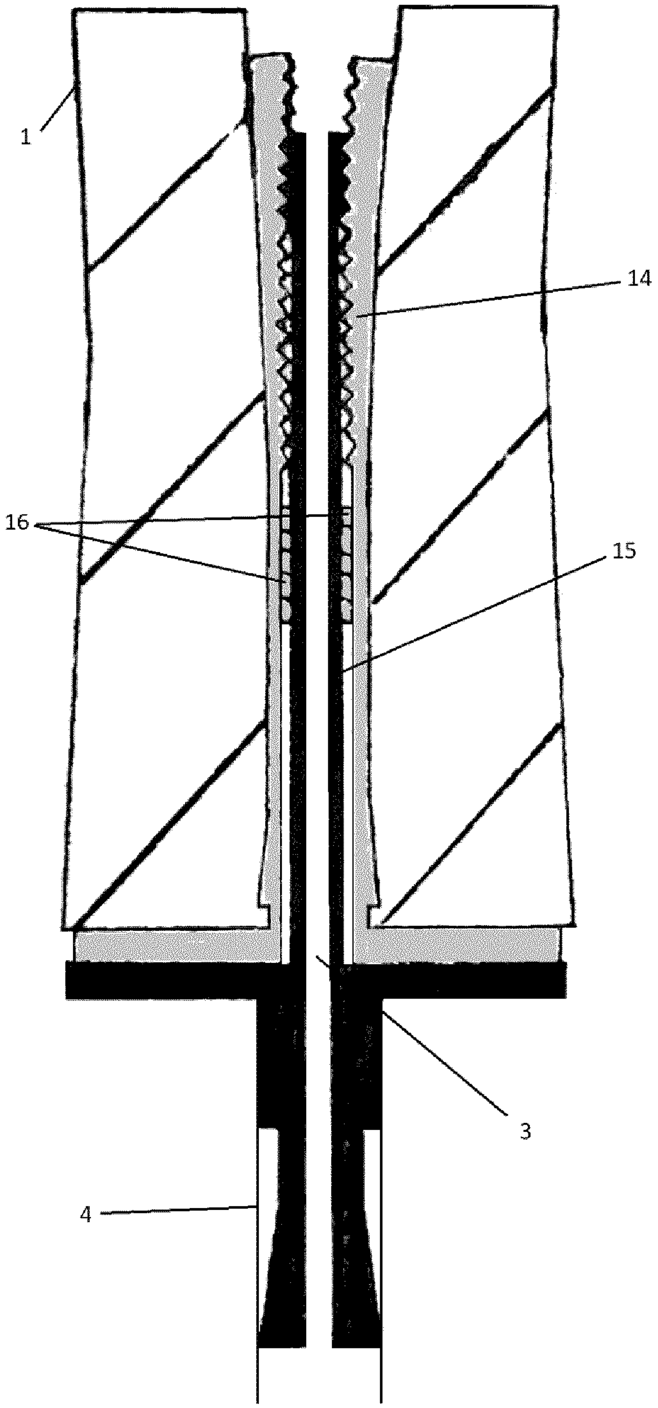
FIG. 9 shows the same cross section as in FIG. 8 after the movement has been completed with the inner element fully seated into the outer element and the walls of the retentive end expanded.

FIG. 9 shows the same cross section after the movement has been completed with the inner element fully seated into the outer element and the walls of the retentive end expanded.

In yet another embodiment of the invention, there is provided a click syringe acting as the fluid source that can both inject and suction the fluid and its plunger clicks against its barrel with every predetermined volume (such as 0.5 mL) of fluid injected or suctioned and wherein the tip is connected to the tube, it is composed of at least the following parts: a plunger with a thumb rest that fits snugly into a barrel, a seal on the upper end of the plunger, a barrel with a flange, and a tip on the upper end of the barrel and wherein the improvements comprise: the barrel has a trioval cross sectional shape to prevent any rotation of the plunger inside the barrel but can have a square oval or a rectangular oval shape in other embodiments; the plunger has a cross section that corresponds to that of the barrel, one of the sides of the plunger has equally spaced pyramidal steps or protrusions; a protruding step from the inside surface of lower part of the barrel's wall with a pyramidal depression that fits exactly against the steps on the plunger; two incomplete longitudinal cuts along the long axis of the barrel on one side of the lower portion of the barrel's wall, going through the barrel's wall and its flange, positioned on each side of the pyramidal indentation that imparts flexibility to that part of the wall, this design causes the plunger to give a click with each predetermined volume of fluid injected when advanced into the barrel while allowing the plunger to move in both directions inward and outward to inject or to suction, that click provides auditory and tactile feedback that allows the operator to keep track of the injected volume without looking at the syringe, the click syringe's design also allows the operator to control injection rate and volume since it provides a soft stop with each click of the plunger against the barrel wall, it also allows the operator to concentrate on the surgical field while injecting, in an alternative embodiment the spacing between the pyramidal steps on the plunger or the size of the cross section of the barrel can be modified to produce a repeated click with any other volume injected or suctioned bigger or smaller than the predetermined volume.

Figure 3:
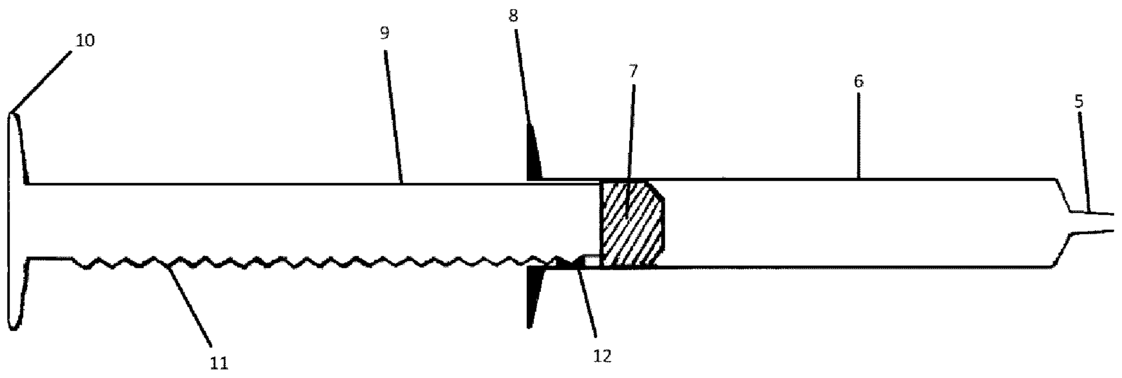
FIG. 3 is a longitudinal section illustration of the click syringe of FIG. 1.

FIG. 3 is longitudinal section illustration of a click syringe in accordance with the invention.

Figure 4:
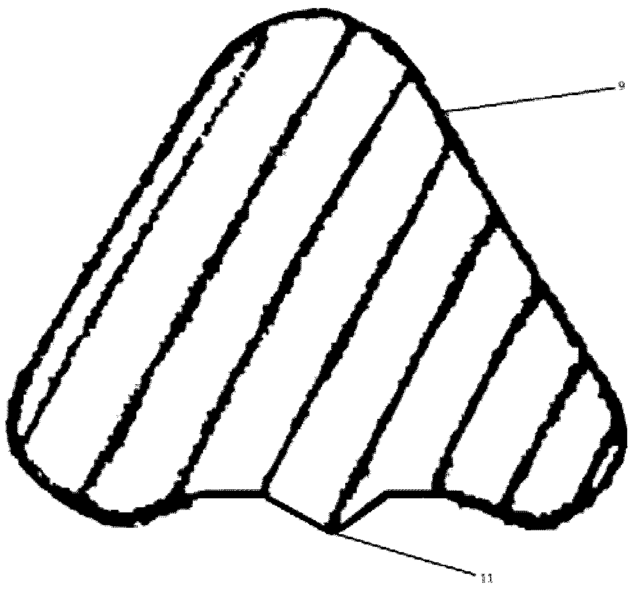
FIG. 4 is a cross sectional illustration of the plunger belonging to the click syringe of FIG. 1.

FIG. 4 is cross sectional illustration of the plunger belonging to the click syringe going through the tip of one of the pyramidal steps highlighting the trioval cross section of the plunger.

Figure 5:
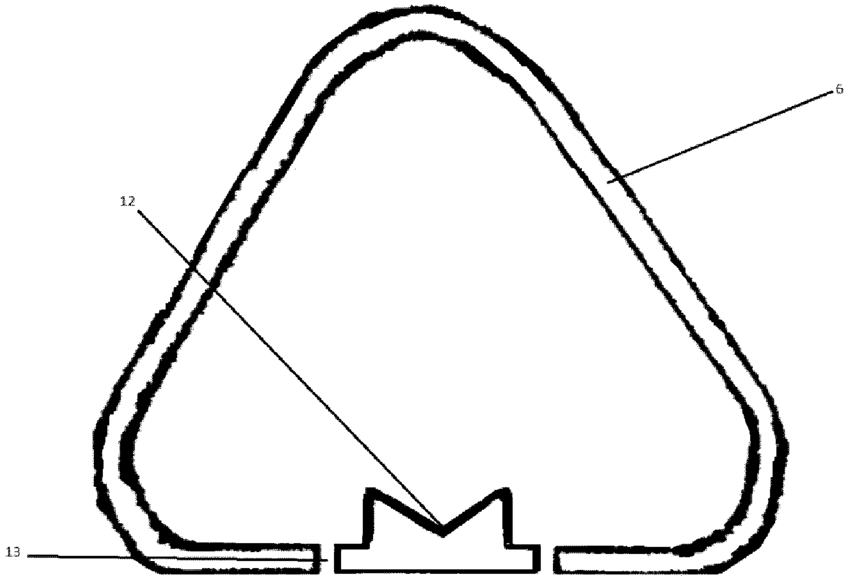
FIG. 5 is a cross sectional illustration of the click syringe's barrel at the level of the pit of the pyramidal indentation.

FIG. 5 is cross sectional illustration of the click syringe's barrel at the level of the pit of the pyramidal indentation, highlighting the trioval cross section of the barrel as well as two incomplete cuts in the barrel's wall 13 on both sides of said indentation.

Figure 6:
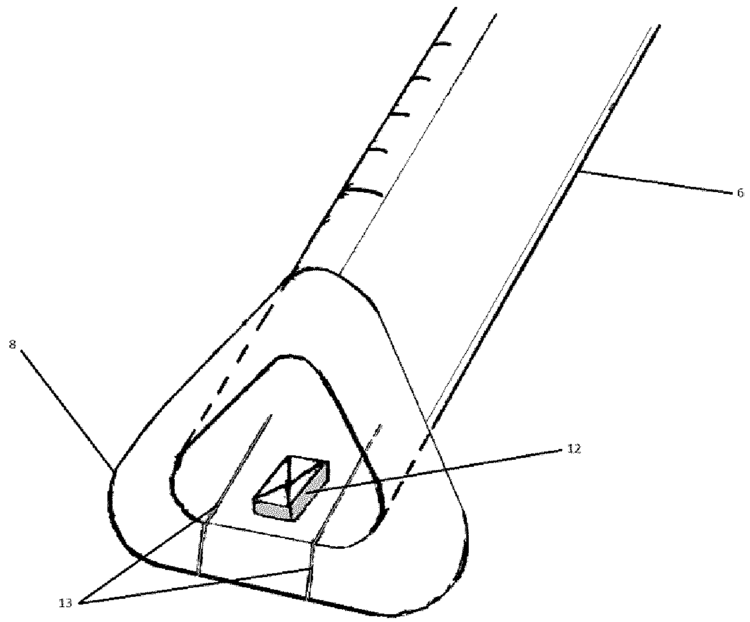
FIG. 6 is a perspective view of the lower portion of the click syringe according to an embodiment of the present invention highlighting the trioval cross section of the barrel as well as the incomplete cuts in the barrel's wall on both sides of the pyramidal indentation.

FIG. 6 is a perspective view of the lower portion of the click syringe according to an embodiment of the present invention highlighting the trioval cross section of the barrel as well as the incomplete cuts in the barrel's wall on both sides of the pyramidal indentation.

In yet another embodiment of the invention, there is provided a plurality of regular conical plugs that have a similar external shape to that of the retentive ends and serve to plug one or more osteotomy sites at a time to allow for a more extensive sinus lift on the same side of the maxilla through multiple osteotomies; they have the same outer shape and design as the retentive ends, are fabricated from the same material, and are also made in different sizes so that the diameter of the cross section of the upper end closely matches those of different drilling systems that create the osteotomies, the only difference is that the plugs are not hollow to enable them to act as plugs for multiple osteotomy sites and allow maxillary sinus mucosa dissection and lifting for a larger area when needed during the same surgical intervention, hence increasing the range of defects that can be grafted in the maxilla with a less invasive technique using this apparatus.

Figure 10:
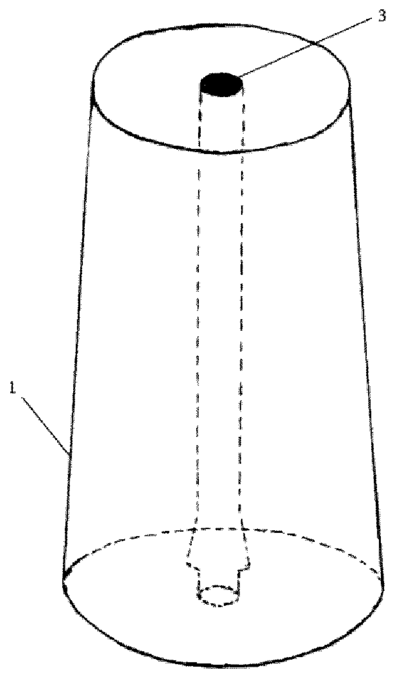
FIG. 10 shows a perspective view of an embodiment of the conical retentive end.

FIG. 10 shows a perspective view of a conical retentive end in accordance with the invention.

Figure 11:
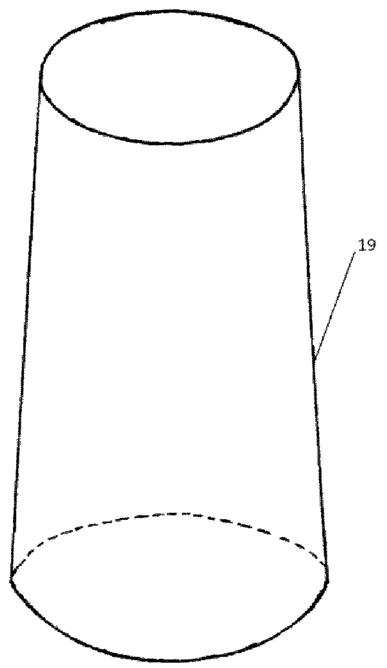
FIG. 11 shows a perspective view of a conical plug.

FIG. 11 shows a perspective view of a conical plug 19.

In yet another embodiment of the invention, there is provided a plurality of expanding plugs that have a similar external shape to that of the retentive ends and have the same function as the regular conical plugs plus allowing the operator to control the amount of retention into the osteotomy by expanding the conical plug from within, they are retentive ends fitted on an expansion device similar to the expanding injection stents composed of at least two elements, an outer element identical to that of the expanding injection stent and an inner element identical to that of the expanding injection stent except it is not hollow and its lower end does not retain a tube, this design allows for the expansion of the plugs once inserted in any osteotomy providing a tighter fit by turning the inner element's base clockwise.

Figure 12:
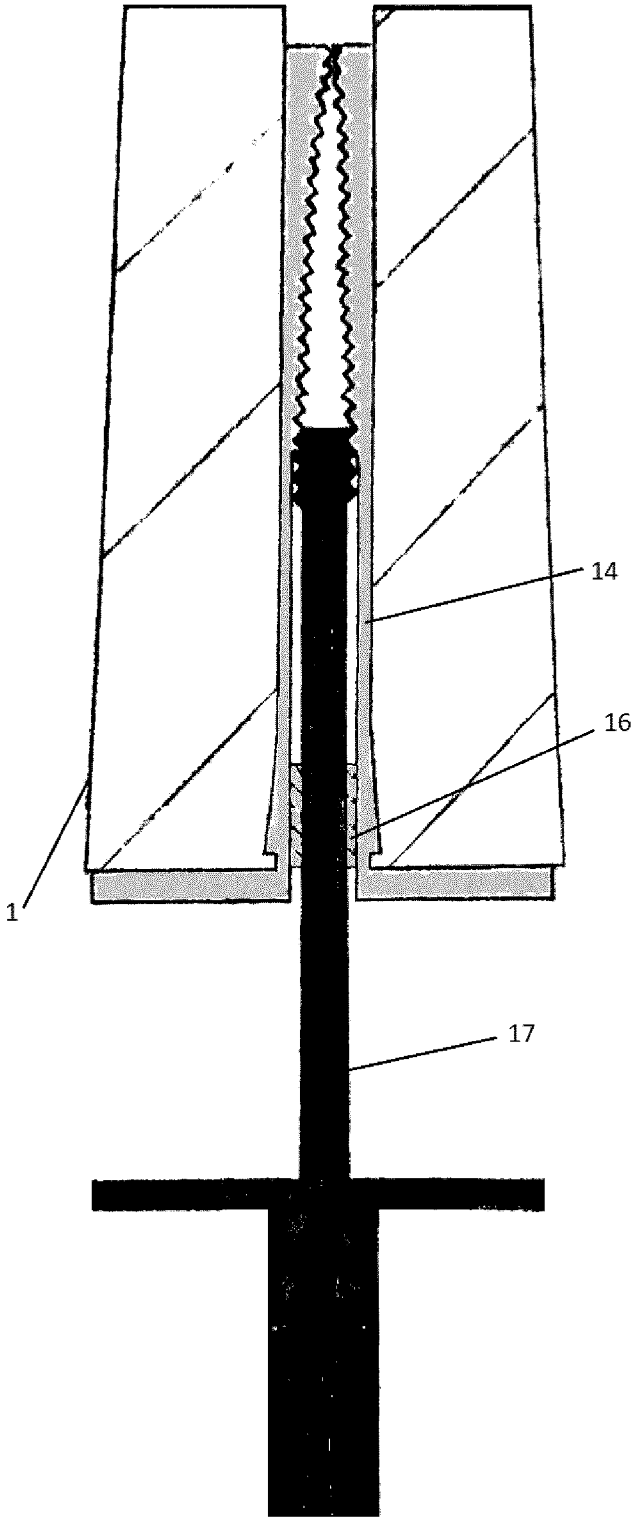
FIG. 12 shows a cross sectional illustration of an expanding plug featuring a retentive end fitted on an expansion device similar to the expanding injection stent.

FIG. 12 shows a cross sectional illustration of an expanding plug featuring a retentive end fitted on an expansion device similar to the expanding injection stent of at least two elements, an outer element identical to that of an expanding injection stent and a solid inner element 17 where the lower end does not retain a tube.

Figure 13:
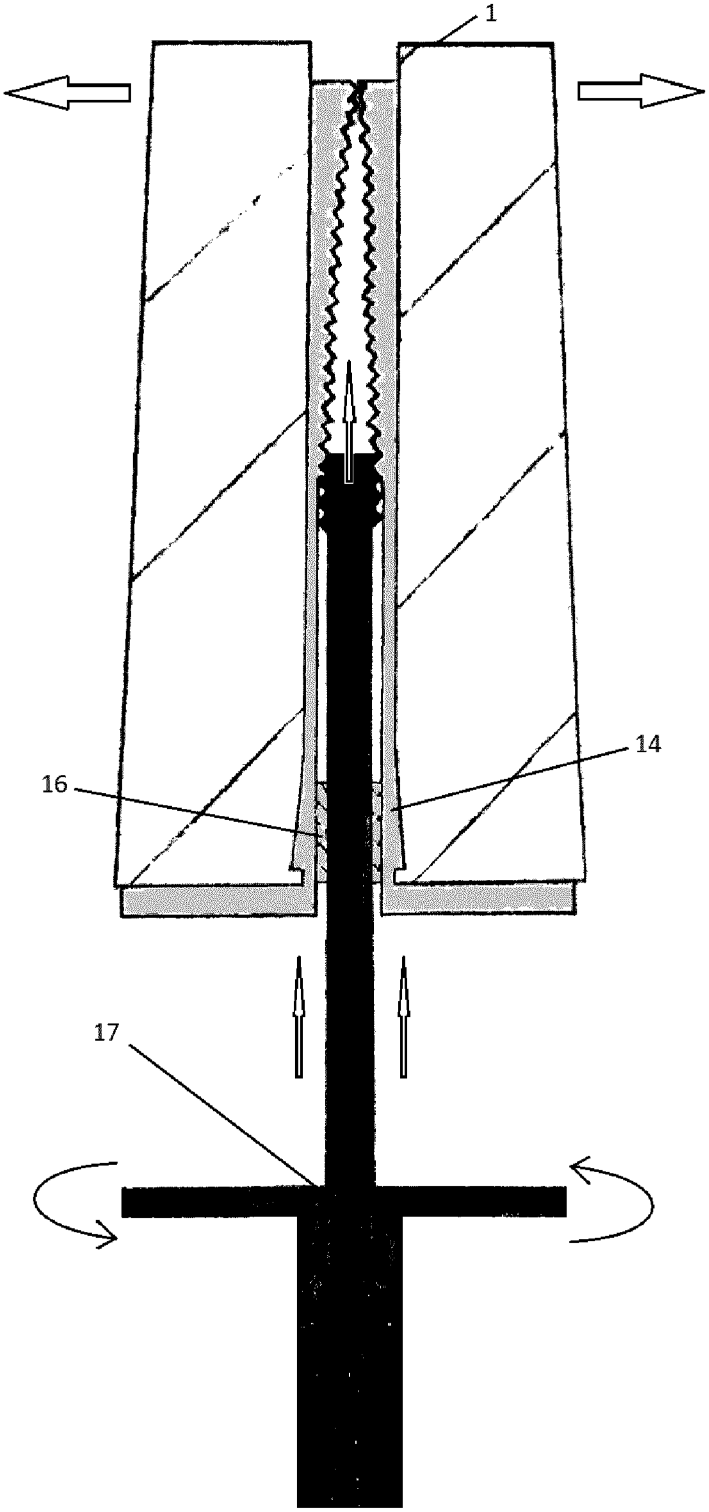
FIG. 13 shows the same cross section as in FIG. 12 with the arrows explaining the effect of turning the solid inner element clockwise on the upward movement of said element into the outer element and the lateral expansion of the upper portion of the walls of the outer element in turn pushing and expanding the walls of the retentive end.

FIG. 13 shows the same cross section as in FIG. 12 with the arrows explaining the effect of turning the solid inner element clockwise on the upward movement of said element into the outer element and the lateral expansion of the upper portion of the walls of the outer element in turn pushing and expanding the walls of the retentive end.

Figure 14:
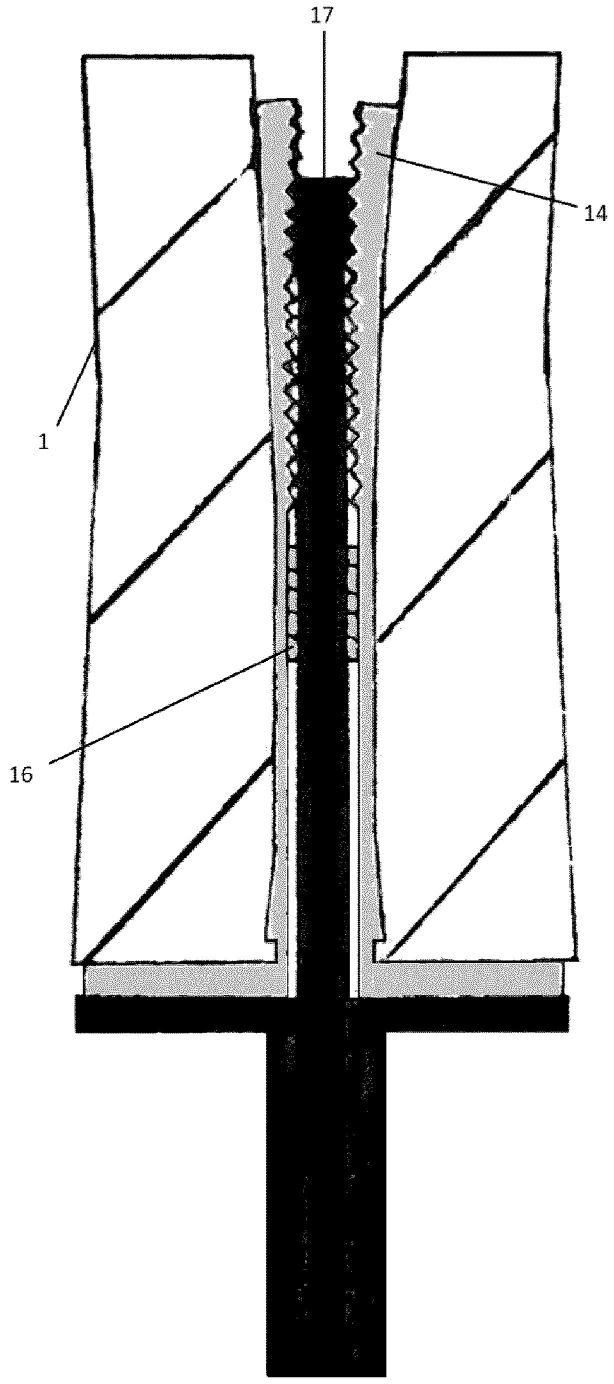
FIG. 14 shows the same cross section as in FIG. 13 after the movement has been completed with the solid inner element fully seated into the outer element and the walls of the retentive end expanded.

FIG. 14 shows the same cross section in FIG. 13 after the movement has been completed with the solid inner element fully seated into the outer element and the walls of the retentive end expanded.

Figure 15:
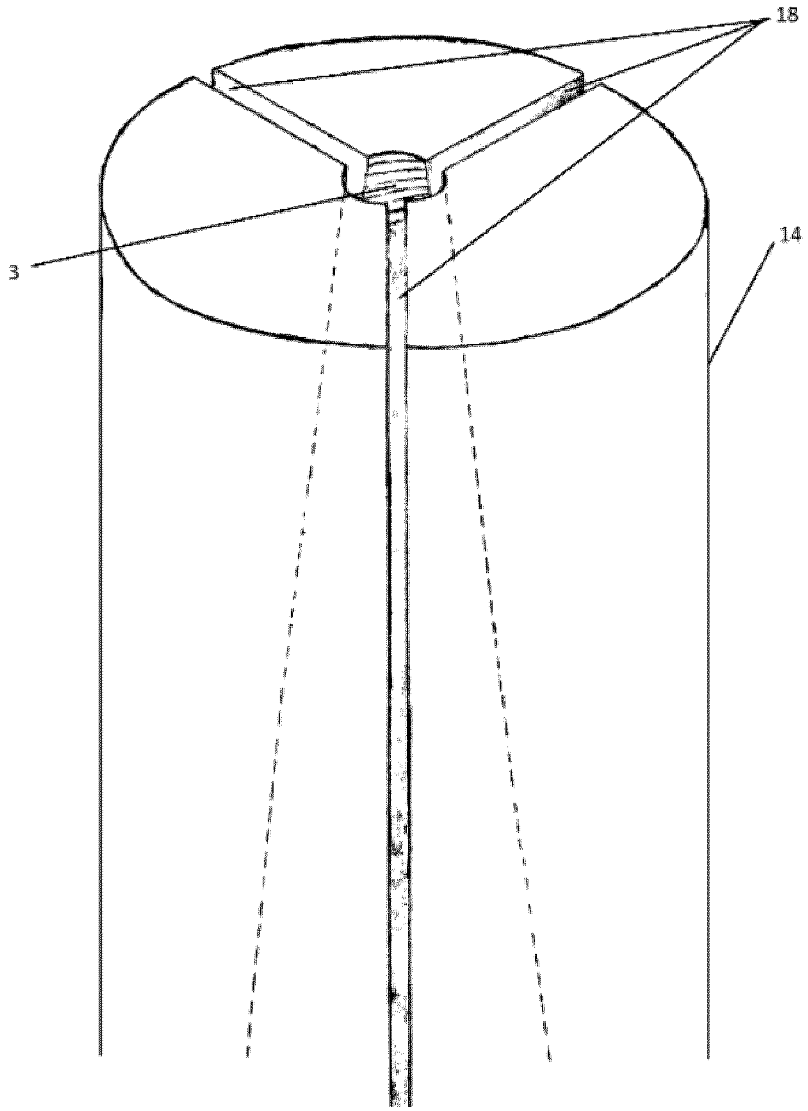
FIG. 15 shows a perspective view of the upper portion of the outer element highlighting the incomplete cuts through the walls of said element connecting the outer surface to its lumen.

FIG. 15 shows a perspective view of the upper portion of the outer element highlighting the incomplete cuts 18 through the walls of said element connecting the outer surface to its lumen, those cuts impart flexibility and allow said element to expand.

Figure 16:
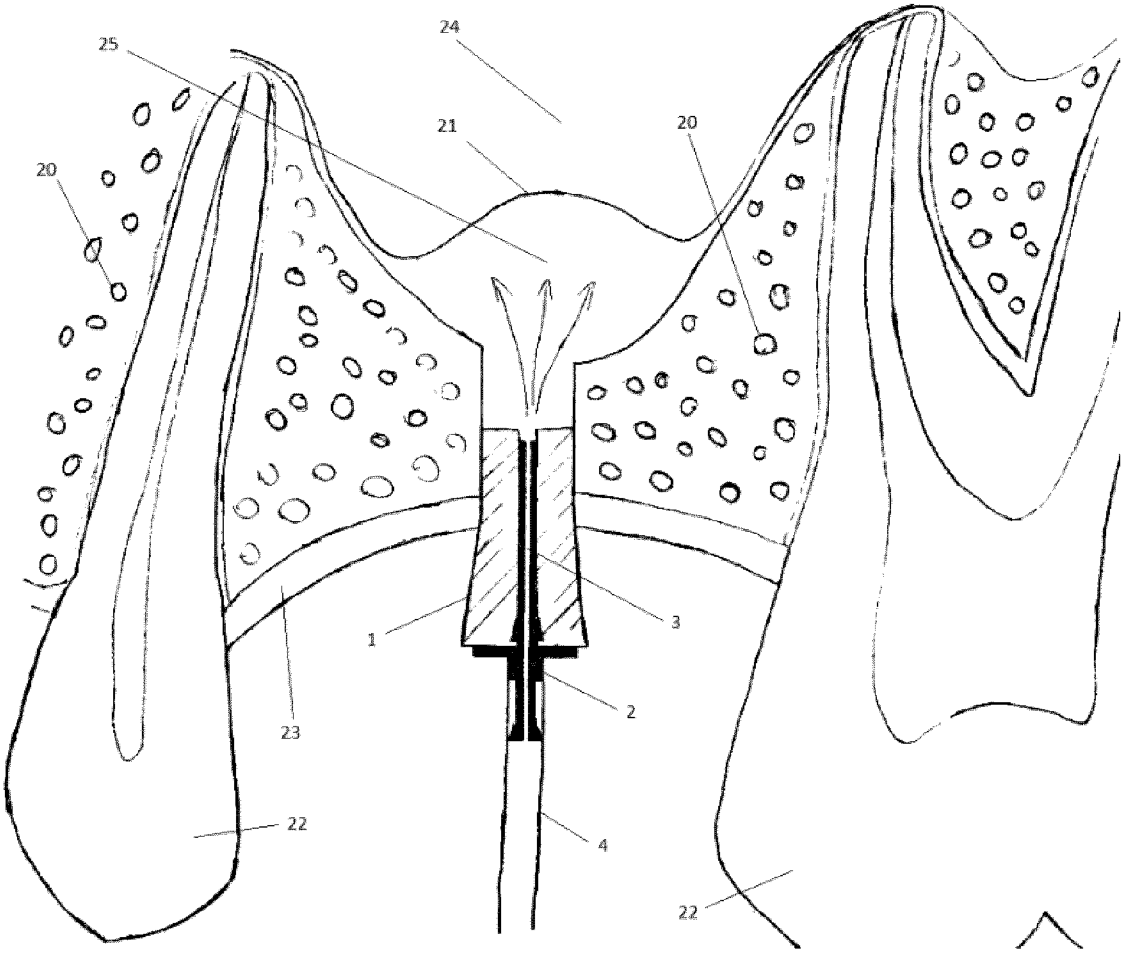
FIG. 16 is a cross sectional illustration in the maxilla showing the retentive end/injection stent assembly placed into an osteotomy through the gingiva and the maxillary bone in a single edentulous space in between the two neighbouring teeth.

FIG. 16 is a cross sectional illustration in the maxilla showing the retentive end/injection stent assembly placed into an osteotomy through the gingiva 23 and the maxillary bone 20 in a single edentulous space in between the two neighbouring teeth 22, the arrows indicate a fluid being injected exerting hydraulic pressure to lift the maxillary sinus mucosa 21 in the space occupied by the sinus lumen 24 and away from the bone creating an artificial space 25 between both structures that will eventually be filled with a bone substitute or an implant or both, this figure also shows how the softer walls of the retentive ends are elastically deformed to conform to the inner walls of the osteotomy leading to a friction fit that does not require the operator to hold it throughout the injection process.

Figure 17:
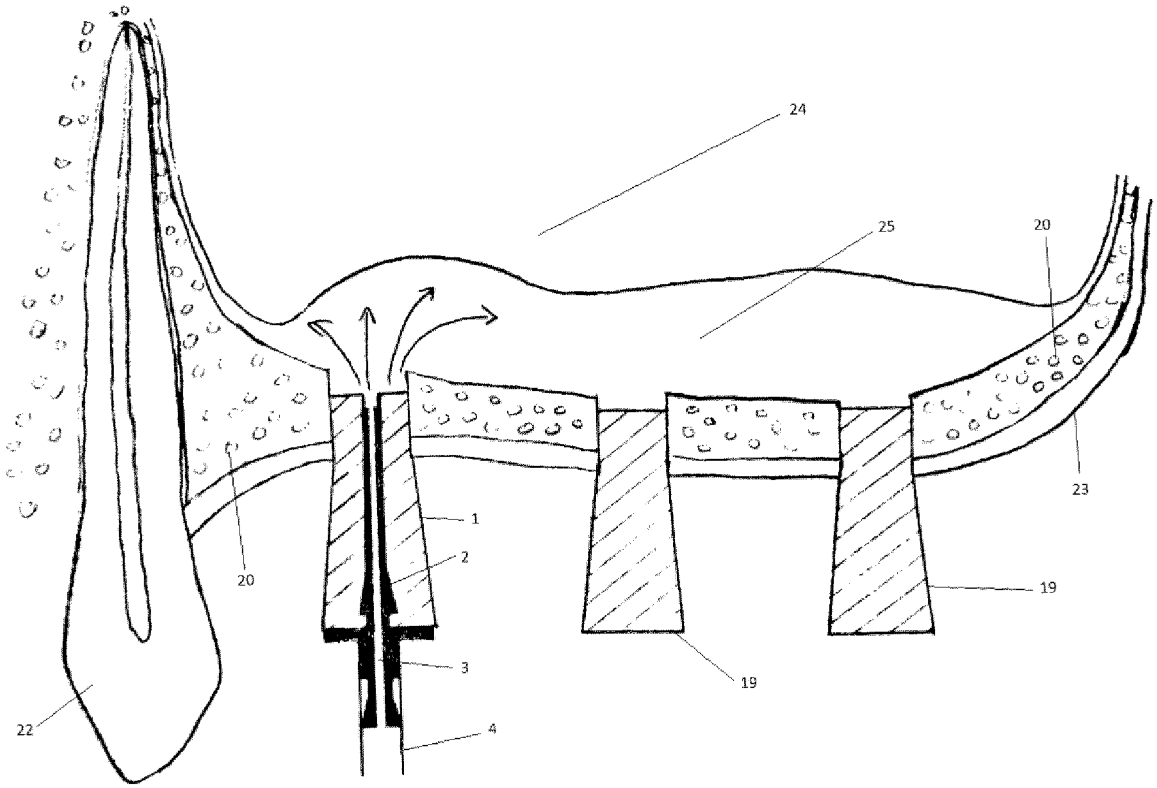
FIG. 17 shows a cross sectional illustration in the maxilla in a scenario of multiple missing posterior teeth, two conical plugs are placed to seal osteotomies where the maxillary sinus mucosa was previously lifted, and a retentive end/injection assembly is placed into the freshly prepared osteotomy.

FIG. 17 shows a cross sectional illustration in the maxilla in a scenario where multiple posterior teeth are missing, where two conical plugs are placed to seal osteotomies where the maxillary sinus mucosa was previously lifted, and a retentive end/injection assembly is placed into the freshly prepared osteotomy to lift the corresponding portion of said mucosa creating a much larger artificial space compared to the one in FIG. 16 that will subsequently be grafted with a bone substitute.

An alternative embodiment of the retentive end/injection stent comprises: a plurality of hollow injection screws; a plurality of deformable sealing rings that fit around said screw; the injection screw is made of a hard material, a metal or a polymer, it is hollow through the center to allow the injection of a fluid, the upper portion is externally threaded and is separated from the lower portion by a wider base, the lower portion a larger polygonal coupling part to be engaged by a wrench and a smaller cylindrical connection part with at least one retention feature to hold the fluid supply tube, the injection screw is supplied with different diameters of the threaded part to fit into osteotomies made by different drill diameters; the sealing ring is made of soft and deformable material, it is supplied in multiple heights, it is internally threaded to fit around the injection screw and sits against the wide base of said screw, it has an upper conical portion that is fixed in size and a lower straight portion that can have different heights depending on how deep the osteotomy is.

Figure 18:
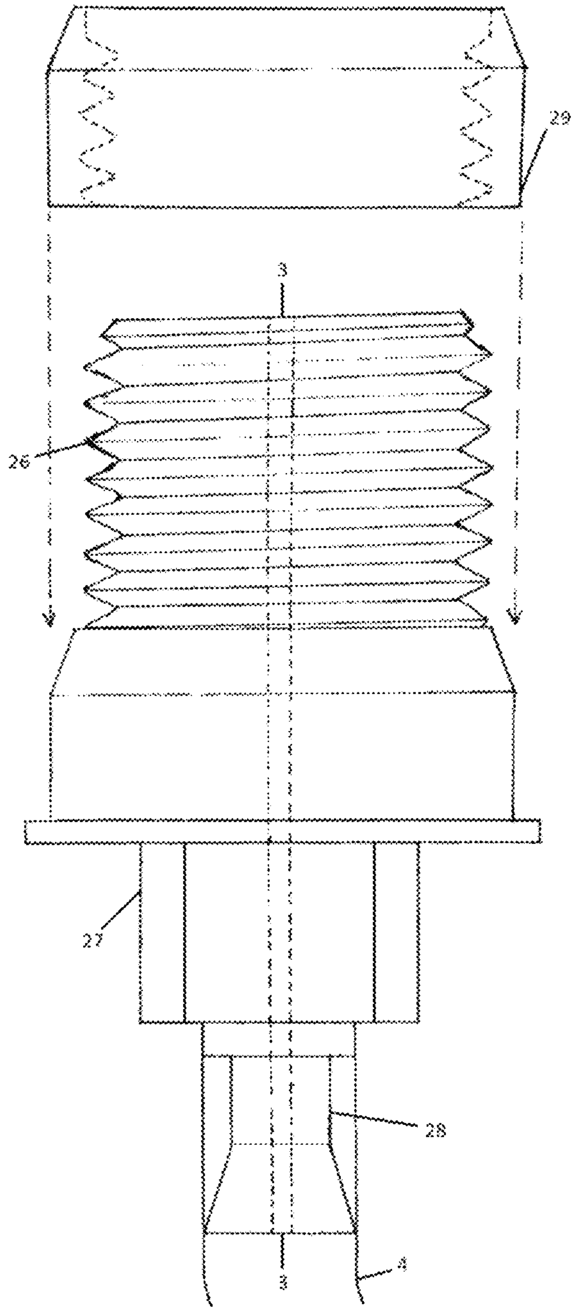
FIG. 18 shows an alternative embodiment to the retentive end/injection stent assembly, where said assembly is being replaced with an injection screw that has a polygonal wrench coupling portion and a cylindrical tube along with a sealing ring.

FIG. 18 shows an alternative embodiment to the retentive end/injection stent assembly, where said assembly is being replaced with an injection screw 26 that has a polygonal wrench coupling portion 27 and a cylindrical tube connecting portion 28 combined with a sealing ring 29 made of softer material.

Figure 20:
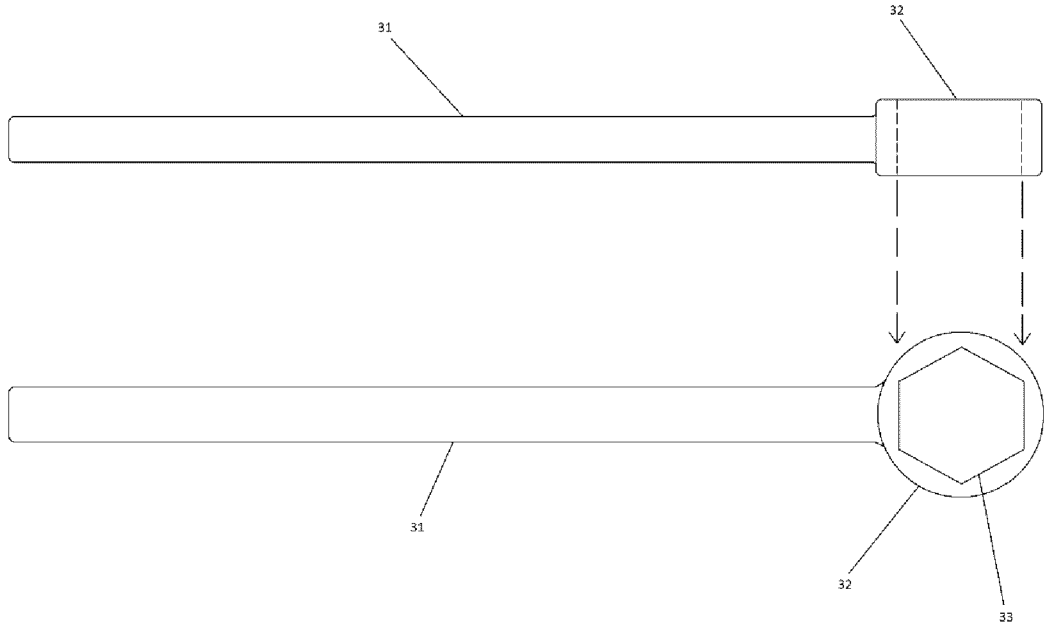
FIG. 20 shows a side view and a top view of the wrench used to screw and unscrew the injection screw/sealing ring assembly into and out of the osteotomy.

To screw and unscrew this assembly, a specific wrench is used that has a handle and a hollow coupling end with a polygonal inner shape that fits specifically around the coupling part on the injection screw. FIG. 20 shows a side view and a top view of the wrench used to screw and unscrew the injection screw/sealing ring assembly into and out of the osteotomy, said wrench is made of a handle portion 31 and a coupling end 32 with an inner polygonal shape 33 that fits specifically around the polygonal wrench coupling portion of the injection screw and the plug screw.

The method for its use may comprise the following steps:

- choosing the size of injection screw corresponding to the drill used to create the osteotomy,
- choosing the proper height of the straight portion of the sealing ring according to the depth of the osteotomy,
- fitting the sealing ring around the upper portion of the injection screw,
- placing the screw/ring assembly into the osteotomy,
- fitting the coupling end of the wrench to the coupling part on the injection screw,
- turning the injection screw clockwise using the wrench until the conical portion of the sealing ring is tightly pressed against the bone surface sealing the osteotomy when the desired depth is reached,
- disengaging the wrench from the injection screw,
- then connecting the fluid tube to the cylindrical connection part on the screw, using the wrench to unscrew the assembly when needed.

An alternative embodiment of the conical plug comprises: a plurality of solid plug screws; a plurality of deformable sealing rings that fit around said screws, whereas the sealing rings are identical to the ones used around the injection screws and the solid screws are similar in design to the injection screws except they are not hollow and lack the cylindrical connection portion, once screwed into the osteotomy using the specified wrench this assembly achieves a tight seal with the bone.

Figure 19:
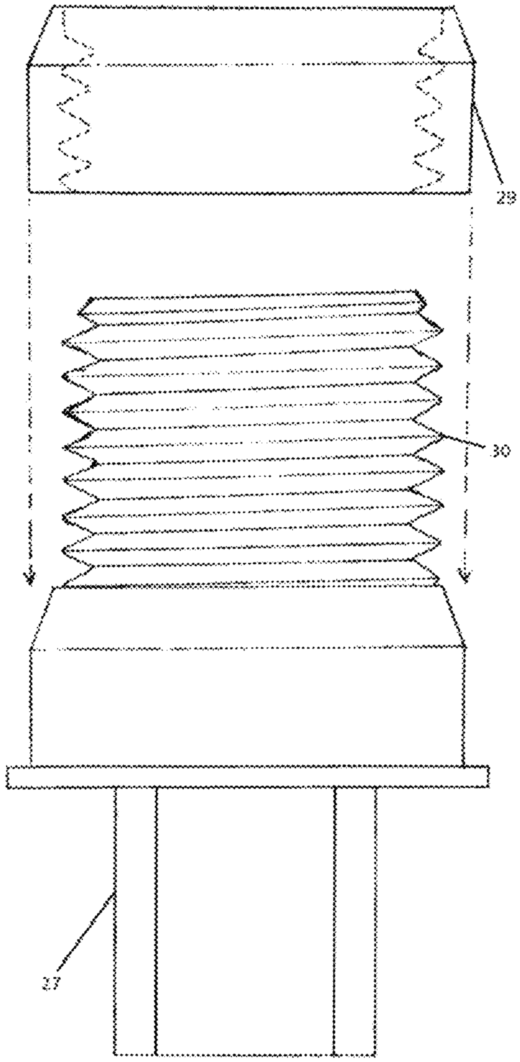
FIG. 19 shows an alternative embodiment to the conical plugs, where said plugs are being replaced with a solid plug screw and a sealing ring.

FIG. 19 shows an alternative embodiment to the conical plugs, where said plugs are being replaced with a solid plug screw 30 that has a polygonal wrench coupling portion and no cylindrical tube connecting portion combined with a sealing ring made of softer material.

This apparatus is primarily used in combination with an injectable positive contrast medium to create the artificial space between the maxillary bone and the sinus mucosa. This is a new use for all positive contrast media, characterised in that: these positive contrast media are not injected into an existing body cavity to detect its shape as their traditional use entails, quite the opposite they are used to create an artificial space and then reveal an image of the shape of the created space using radiography, in the case of maxillary sinus membrane perforation their fluidity plays an important role as they follow the shape of the structure they come in contact with or assume the shape of a stagnating liquid making it easy to recognise the perforation radiographically, also it does not remain in the body to be metabolised or excreted, as is traditionally the case, it is instead suctioned back out, so it virtually stays out of the body.

There are two main scenarios when dealing with missing posterior maxillary teeth a single missing versus multiple missing maxillary posterior teeth on the same side of the maxilla, methods according to this invention to deal with each scenario are as follows:

1) A method for maxillary sinus mucosa elevation and for determining whether said mucosa is successfully lifted or perforated, in the scenario of a single missing posterior tooth, may comprise the steps of:
   - establishing access to the maxillary sinus mucosa through an osteotomy in the maxillary bone;
   - securing a hollow working end into the osteotomy that can be reversibly fixed therein and that can provide an excellent seal inside and around the edge of the osteotomy sealing it from the oral cavity;
   - using a fluid supply source that is connected to said working end and that allows the operator to control the injection rate and volume;
   - injecting a fluid positive contrast medium contained in the fluid supply source towards the maxillary sinus mucosa exerting hydraulic pressure to separate said membrane from the bone of the maxilla;
   - taking a plain radiograph of the operated site producing a two dimensional image, an image with a well defined convex radio-opacity with a dome-like, semilunar, or balloon like shape on the floor of the maxillary sinus indicates the sinus mucosa integrity is preserved an that the lifting process is a success, that well defined shape does not change regardless of the position of the head of the person being operated, on the other hand an image of an ill defined radio-opacity within the maxillary sinus imitating the shape of stagnating fluid against the sinus floor or its anterior/posterior wall depending on the head position of the person being operated indicates that the sinus mucosa is perforated, the shape of the radio-opacity will change on subsequent radiographs taken of the same area if the head position is changed;
   - removing the working end and suctioning out the contrast medium then rinsing with saline;
   - proceeding with the bone grafting or implant placement procedure or both if the radiograph suggests a successful lifting process;
   - aborting the procedure or switching to a lateral window approach to have direct access to repair the membrane if the radiograph suggests the membrane is perforated.
2) A method for maxillary sinus mucosa elevation and for determining whether said mucosa is successfully lifted or perforated, in the scenario of a multiple missing posterior teeth on the same side of the maxilla, may comprise the steps of:

establishing access to the maxillary sinus mucosa through an osteotomy in the maxillary bone;

securing a hollow working end into the osteotomy that can be reversibly fixed therein and that can provide an excellent seal inside and around the edge of the osteotomy sealing it from the oral cavity;

using a fluid supply source that is connected to said working end and that allows the operator to control the injection rate and volume;

injecting a fluid positive contrast medium contained in the fluid supply source towards the maxillary sinus mucosa exerting hydraulic pressure to separate said membrane from the bone of the maxilla;

taking a plain radiograph of the operated site producing a two dimensional image, an image with a well defined convex radio-opacity with a dome-like, semilunar, or balloon like shape on the floor of the maxillary sinus indicates the sinus mucosa integrity is preserved an that the lifting process is a success, that well defined shape does not change regardless of the position of the head of the person being operated, on the other hand an image of an ill defined mostly flat radio-opacity within the maxillary sinus imitating the shape of stagnating fluid against the sinus floor or its anterior/posterior wall depending on the head position of the person being operated indicates that the sinus mucosa is perforated, the shape of the radio-opacity will change on subsequent radiographs taken of the same area if the head position is changed;

removing the working end and suctioning out the contrast medium then flushing with saline;

aborting the procedure or switching to a lateral window approach if the radiograph suggests the sinus mucosa is perforated;

establishing access to the maxillary sinus mucosa through a subsequent osteotomy in the maxillary bone if the radiograph suggests the sinus mucosa is intact;

plugging the first osteotomy with an object that provides a water tight seal to prevent the contrast medium injected into the second osteotomy from escaping through the first one instead of lifting an extra portion of the sinus mucosa;

injecting the contrast medium into the second osteotomy applying hydraulic pressure on the corresponding portion of the membrane to dissect and elevate that portion;

taking a second plain radiograph to determine if the lift is successful or if the membrane is perforated as described previously;

repeating the previous six steps if a further osteotomy is planned;

proceeding with the bone grafting or implant placement procedure or both if the radiograph suggests a successful lifting process;

aborting the procedure or switching to a lateral window approach to have direct access to repair the membrane if the radiograph suggests the membrane is perforated.

A good example for the radiographic results obtained when using the two methods described earlier when the sinus mucosa is intact or when said mucosa is perforated can be observed in the FIGS. 21 through 27.

A prototype of the present invention has been tested on thawed frozen sheep heads: FIGS. 21 through 23 belong to the same head showing the left maxillary sinus and posterior teeth, FIG. 21 is the preoperative radiograph, FIG. 22 shows the typical ballooning effect seen when the contrast medium has successfully dissected and lifted the maxillary sinus mucosa whereas the radiograph in FIG. 23 was taken after an artificial perforation had been created and the contrast medium injected shows how the contrast medium follows the shape of the sinus floor and anterior wall with no ballooning and a more diffuse radio opacity.

FIGS. 24 through 27 belong to a different sheep head and shows the right maxillary sinus and posterior teeth, FIG. 24 is the preoperative radiograph, FIG. 25 shows a successful lift while the retentive end/injection stent assembly were still plugging the osteotomy, FIG. 26 shows the same lifted membrane with the conical plug sealing the osteotomy and FIG. 27 is the post perforation radiograph where more diffuse radio opacity is seen and the contrast medium is stagnating against the anterior wall of the sinus since the head was tilted forward.

When the proposed methods are applied to the apparatus in the present invention the methods could be as follows:

1) A method of using the apparatus, according to the present invention, for elevating the maxillary sinus mucosa, in humans or in animals, and for determining whether said mucosa dissection and elevation is successful or if the mucosa is perforated during the process of sinus mucosa lifting prior to the application of any bone graft material or prior to implant placement, in the scenario of a single missing posterior tooth, comprising the steps of:

establishing access to the maxillary sinus mucosa through an osteotomy in the maxillary bone;

selecting a proper size retentive end that corresponds to that of the prepared osteotomy;

securing the selected retentive end around an injection stent;

connecting a click syringe containing a contrast medium to a tube;

connecting the selected retentive end/injection stent assembly to the click syringe/tube assembly;

securing the retentive end/injection stent assembly into the osteotomy by pressing and advancing said assembly into the osteotomy elastically deforming the retentive end to closely conform to the inner walls of the osteotomy, this provides a stable friction fit to the osteotomy that frees the operator from the need to keep holding this assembly throughout the injection process and provides a tight seal;

replacing the regular injection stent with an expanding injection stent in combination with the same retentive end, if the retention and stability of the assembly are deemed to be inadequate while using the regular injection stent, the new assembly is then placed back into the osteotomy and the inner element of the expanding injection stent is turned clockwise to provide a tighter fit to the liking of the operator;

advancing the click syringe's plunger into its barrel to inject the contrast medium through the tube and the retentive end/injection stent assembly, the seal provided by the friction fit of the retentive end against the osteotomy walls prevents the contrast medium from flowing out of the created space and transforms the digital pressure applied on the plunger's thumb rest into hydraulic pressure onto the maxillary sinus membrane, leading to the dissection and elevation of the maxillary sinus mucosa and creating an artificial space, the movement of the plunger provides sensory and auditory feedback (a click) to the operator with every predetermined volume (such as 0.5 mL) injected, the operator stops injecting once the desired volume is reached;

taking a first plain radiograph of the operated site in the maxilla producing a two dimensional image, an image with a well defined convex radio-opacity with a dome-like, semilunar, or balloon like shape within the maxillary sinus indicates the sinus mucosa integrity is preserved an that the lifting process is a success, that well defined shape does not change regardless of the position of the head of the person being operated, on the other hand an image of an ill defined mostly flat radio-opacity within the maxillary following the shape of the sinus floor or its anterior/posterior wall depending on the head position of the person being operated indicates that the sinus mucosa is perforated, the shape of the radio-opacity in this scenario will change on subsequent radiographs taken of the same area if the head position is changed;

tilting the operated person's head forward or backward and taking a second plain radiograph to allow the capture of the change in the shape or position of the radio-opacity, a change in its shape/position indicates a perforation and no change in the shape of the radio-opacity while maintaining the convexity indicates a successful maxillary sinus mucosa lifting (this is an optional step for confirmation only);

suctioning the injected contrast medium by withdrawing the click syringe plunger then removing the retentive end/injection stent assembly out of the osteotomy, a dental suction tip in combination with saline rinse can be used after its removal to ensure the complete removal of the contrast medium.

2) A method of using the apparatus, according to the present invention, for elevating the maxillary sinus mucosa, in humans or in animals, and for determining whether said mucosa dissection and elevation is successful or if the mucosa is perforated during the process of sinus mucosa lifting prior to the application of any bone graft material or prior to implant placement, in the scenario of a multiple missing posterior teeth on the same side of the maxilla, comprising the steps of:

establishing access to the maxillary sinus mucosa through a first osteotomy in the maxillary bone;

selecting a proper size retentive end that corresponds to that of the prepared osteotomy;

securing the selected retentive end around an injection stent;

connecting a click syringe containing a contrast medium to a tube;

connecting the selected retentive end/injection stent assembly to the click syringe/tube assembly;

securing the retentive end/injection stent assembly into the osteotomy by pressing and advancing said assembly into the osteotomy elastically deforming the retentive end to closely conform to the inner walls of the osteotomy, this provides a stable friction fit to the osteotomy that frees the operator from the need to keep holding this assembly throughout the injection process and provides a tight seal;

replacing the regular injection stent with an expanding injection stent in combination with the same retentive end, if the retention and stability of the assembly are deemed to be inadequate while using the regular injection stent, the new assembly is then placed back into the osteotomy and the inner element of the expanding injection stent is turned clockwise to provide a tighter fit to the liking of the operator;

advancing the click syringe's plunger into its barrel to inject the contrast medium through the tube and the retentive end/injection stent assembly, the seal provided by the friction fit of the retentive end against the osteotomy walls prevents the contrast medium from flowing out of the created space and transforms the digital pressure applied on the plunger's thumb rest into hydraulic pressure onto the maxillary sinus membrane, leading to the dissection and elevation of the maxillary sinus mucosa and creating an artificial space, the movement of the plunger provides sensory and auditory feedback (a click) to the operator with every predetermined volume (such as 0.5 mL) injected, the operator stops injecting once the desired volume is reached;

taking a first plain radiograph of the operated site in the maxilla producing a two dimensional image, an image with a well defined convex radio-opacity with a dome-like, semilunar, or balloon like shape within the maxillary sinus indicates the sinus mucosa integrity is preserved an that the lifting process is a success, that well defined shape does not change regardless of the position of the head of the person being operated, on the other hand an image of an ill defined mostly flat radio-opacity within the maxillary following the shape of the sinus floor or its anterior/posterior wall depending on the head position of the person being operated indicates that the sinus mucosa is perforated, the shape of the radio-opacity in this scenario will change on subsequent radiographs taken of the same area if the head position is changed;

suctioning the injected contrast medium by withdrawing the click syringe plunger;

removing the retentive end/injection stent assembly out of the osteotomy;

establishing access to the maxillary sinus mucosa through a second osteotomy in the maxillary bone;

selecting a proper size regular conical plug or expanding conical plug, according to the desired level of friction fit, that corresponds to the size of the first osteotomy;

securing the conical plug into the first osteotomy by pressing and advancing said plug into the osteotomy elastically deforming the plug to closely conform to the inner walls of the osteotomy, this provides a stable friction fit to the osteotomy and provides a tight seal;

selecting a proper size retentive end that corresponds to that of the second osteotomy;

securing the selected retentive end around the regular or the expanding injection stent;

connecting the click syringe containing the contrast medium to the tube;

connecting the selected retentive end/injection stent assembly to the click syringe/tube assembly;

securing the retentive end/injection stent assembly into the osteotomy by pressing and advancing said assembly into the osteotomy elastically deforming the retentive end to closely conform to the inner walls of the osteotomy; advancing the click syringe's plunger into its barrel to inject the contrast medium through the tube and the retentive end/injection stent assembly, leading to the dissection and elevation of a portion of the maxillary sinus mucosa corresponding to the second osteotomy and creating an additional artificial space that merges with the previously created space, the operator stops injecting once the desired volume is reached;

taking a second plain radiograph of the operated site in the maxilla producing a two dimensional image, an image with a well defined convex radio-opacity with a dome-like, semilunar, or balloon like shape within the maxillary sinus indicates the sinus mucosa integrity is preserved an that the lifting process is a success, that well defined shape does not change regardless of the position of the head of the person being operated, on the other hand an image of an ill defined mostly flat radio-opacity within the maxillary following the shape of the sinus floor or its anterior/posterior wall depending on the head position of the person being operated indicates that the sinus mucosa is perforated, the shape of the radio-opacity in this scenario will change on subsequent radiographs taken of the same area if the head position is changed;

suctioning the injected contrast medium by withdrawing the click syringe plunger;

removing the retentive end/injection stent assembly out of the osteotomy;

the previous 12 steps can be repeated with any subsequent additional osteotomies.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. An apparatus for maxillary sinus mucosa dissection and elevation, in humans or in animals, that lifts said mucosa away from the maxillary bone by injecting a fluid through an osteotomy or a hole in the maxillary bone to create an artificial space between said mucosa and the maxilla, comprising:

a plurality of interchangeable retentive ends that provide retention for an injection stent within the osteotomy and seal it from the oral environment;

a hollow regular injection stent that allows for flow of a contrast medium towards the maxillary sinus mucosa while supporting one of the plurality of retentive end to prevent its bending and that can be connected to a syringe through a tube;

a hollow expanding injection stent that can be used interchangeably with the hollow regular injection stent and has the same function as said hollow regular injection stent plus allowing an operator to control an amount of retention into the osteotomy by expanding one of the plurality of retentive ends from within, this hollow expanding injection stent can also be connected to a syringe through a tube;

a click syringe acting as a fluid source that can both inject and suction the fluid and with a plunger that clicks against a barrel with predetermined volume of fluid injected or suctioned and wherein a tip is connectable to a tube;

a tube;

a plurality of regular conical plugs that have a similar external shape to that of the retentive ends and serve to plug one or more osteotomy sites at a time to allow for sinus lift on the same side of the maxilla through multiple osteotomies; and a plurality of expanding plugs that have a similar external shape to that of the retentive ends and have the same function as the regular conical plugs plus allowing the operator to control the amount of retention into the osteotomy by expanding the conical plug from within.

2. The apparatus of claim 1 wherein the predetermined volume is between 0.25 mL and 1 mL.

3. The apparatus as claimed in claim 2, wherein the retentive ends are deformable, conical in shape with a taper and a circumference of a given retentive end's cross section gradually increasing from an upper end to a lower end, hollow to fit around the hollow regular injection stent or the hollow expanding injection stent, are made in varied sizes so that the diameter of the cross section of the upper end would be able to match those of different drilling systems that create the osteotomies, are configured to allow friction fit, maintained retention and maintained seal of the said retentive ends upon being inserted into an osteotomy that prevents the injected fluid from escaping through the osteotomy even during exhalation.

4. The apparatus as claimed in claim 3, wherein the retentive ends have a plurality of radio-opaque markings a predetermined distance apart to allow the operator to estimate sinus elevation height on a periapical radiograph taking into consideration any radiographic distortion.

5. The apparatus as claimed in claim 4, wherein the predetermined distance is between 1 and 2 mm.

6. The apparatus as claimed in claim 1, wherein the hollow regular injection stent is a hollow cylinder that is made of a hard material, a metal or a polymer, an upper end is longer in comparison to a lower end, the upper end having a height that corresponds to that of the retentive ends and wherein the upper and lower ends are separated with a base perpendicular to the long axis of the hollow regular injection stent and has a larger circumference than both ends to support the retentive end while being pressed into the osteotomy, the upper end has at least one retentive feature to secure the retentive end around it while being used and the lower end has at least one retentive feature to secure the tube in place.

7. The apparatus as claimed in claim 1, wherein the hollow expanding injection stent is composed of at least two hollow elements; an inner element to be connected to the tube and an outer element connected to the retentive end, the inner element is a hollow cylinder that has an upper end with an externally threaded head and a body surrounded by at least one hydraulic piston seal made of softer material, and a lower end with at least one external retentive feature to hold the tube, both ends are separated by a wider base perpendicular to the inner element's long axis; the outer element is a hollow cylinder that has only an upper end and a wide base, upper half of the upper end of the outer element has a progressively narrowing lumen and is internally threaded, and it has at least three vertical cuts along its long axis connecting an outer surface to the lumen to impart flexibility for expansion, those cuts do not go all the way to its wide base, the threaded head of the inner element has a diameter that fits into a lumen of the outer element and can be screwed therein in such a manner that if the inner element is advanced when screwing it into the outer element by turning the inner element's base clockwise, it will cause the upper element's circumference to increase consequently increasing the circumference of an upper part of the retentive end stretching it to have outer parallel walls on its upper one third, the hydraulic piston seal on the inner element seals both lumens from the outer environment and avoids spilling of the injected fluid.

8. The apparatus as claimed in claim 1, wherein the click syringe is composed of at least the following parts: a plunger with a thumb rest that fits into a barrel, a seal on an upper end of the plunger, a flange, and a tip on its an upper end of the barrel, the barrel has a cross sectional shape to prevent any rotation of the plunger inside the barrel selected from a trioval, a square oval or a rectangular oval; the plunger has a cross section that corresponds to that of the barrel, one of the sides of the plunger has equally spaced pyramidal steps or protrusions; a protruding step from the inside surface of lower part of a wall of the barrel's with a pyramidal depression that fits exactly against the steps on the plunger; two incomplete longitudinal cuts along the long axis of the barrel on one side of a lower portion of the barrel's wall going through the barrel's wall and the barrel's flange positioned on each side of the pyramidal indentation that imparts flexibility to that part of the wall, such as to cause the plunger to emit a click with each predetermined volume of fluid injected when advanced into the barrel while allowing the plunger to move in both directions inward and outward to inject or to suction.

9. The apparatus as claimed in claim 4, wherein the conical plugs have the same outer shape and design as the retentive ends except they are not hollow to allow for plugging the osteotomy and prevent injected fluid from escaping and allow sinus mucosa dissection and lifting a large area through multiple osteotomies.

10. The apparatus as claimed in claim 1, wherein the expanding plugs are retentive ends fitted on an expansion device similar to the hollow expanding injection stents composed of at least two elements, an expanding outer element that is hollow and an inner element that is solid and can be screwed into the outer element to expand it, this design allows for the expansion of the expanding plugs once inserted in any osteotomy providing a tighter fit by turning the inner element's base clockwise.

11. The apparatus as claimed in claim 1, further including a plurality of hollow injection screws and a plurality of deformable sealing rings that fit around said screws as an assembly, the screws can be used to replace the retentive ends and the hollow regular injection stent or the hollow expanding injection stent.

12. The apparatus as claimed in claim 11, further comprising a specific wrench which is used to screw and unscrew, comprising a handle and a hollow coupling end with a polygonal inner shape that fits specifically around a coupling part on the injection screw.

13. The apparatus as claimed in claim 11, wherein the conical plugs are a plurality of solid plug screws; whereas a plurality of deformable sealing rings fit around said plurality of solid plug screws and whereas the sealing rings are identical to the ones in claim 11 and the solid screws are similar in design to the injection screws except they are not hollow, wherein once screwed into the osteotomy achieves a seal with the bone that prevents the injected fluid from escaping through the osteotomy.

14. A method of using the injection screw/sealing ring assembly of claim 11 comprising the following steps:

a) choosing a size of injection screw corresponding to a drill used to create an osteotomy;

b) choosing a height of a straight portion of a sealing ring from the plurality of deformable sealing rings according to a depth of the osteotomy;

c) assembling a sealing ring from a plurality of deformable sealing rings around an upper portion of the injection screw;

d) placing the screw/ring assembly into the osteotomy;

e) fitting a coupling end of a wrench to a coupling part on the injection screw;

f) turning the injection screw clockwise using the wrench until a conical portion of the injection screw is pressed against the bone surface sealing the osteotomy when a desired determined depth is reached;

g) disengaging the wrench from the injection screw then connecting the tube to a cylindrical connection part on the screw;

h) using the wrench to unscrew the assembly.

15. A method of using the apparatus as claimed in claim 1 for elevating a maxillary sinus mucosa, in humans or in animals, and for determining whether said mucosa dissection and elevation is successful or if the mucosa is perforated during the process of sinus mucosa lifting prior to the application of any bone graft material or prior to implant placement, in the scenario of a single missing posterior tooth, comprising the steps of:

a) establishing access to the maxillary sinus mucosa through an osteotomy in a maxillary bone;

b) selecting a retentive end that corresponds to that of the prepared osteotomy;

c) securing the selected retentive end around a hollow regular injection stent;

d) connecting the click syringe containing a contrast medium to the tube;

e) connecting the selected retentive end/hollow regular injection stent as an assembly to the click syringe/tube;

f) securing the retentive end/hollow regular injection stent assembly into the osteotomy by pressing and advancing said assembly into the osteotomy elastically deforming the retentive end to conform to the inner walls of the osteotomy;

g) optionally replacing the hollow regular injection stent with a hollow expanding injection stent in combination with the same retentive end as a new assembly, the new assembly is then placed into the osteotomy and an inner element of the hollow expanding injection stent is turned clockwise to provide a tight fit;

h) advancing the click syringe's plunger into its barrel to inject contrast medium through the tube and the retentive end/expanding or regular injection stent, a seal provided by a friction fit of the retentive end against the osteotomy walls prevents the contrast medium from flowing out of the created space and transforms pressure applied on the plunger into hydraulic pressure onto the maxillary sinus membrane, leading to the dissection and elevation of the maxillary sinus mucosa and creating an artificial space, movement of the plunger provides sensory and auditory feedback to the operator with every predetermined volume injected, the operator stops injecting once a determined volume is reached;

i) taking a first plain radiograph of the operated site in the maxilla producing a two-dimensional image, j) examining the image to identify either a well defined shape having convex radio-opacity with a dome-like, semilunar, or balloon like shape on the floor of the maxillary sinus which is indicative of success or an ill defined mostly flat radio-opacity within the maxillary sinus imitating the shape of stagnating fluid against the sinus floor or its anterior/posterior wall indicative that the sinus mucosa is perforated;

k) suctioning the injected contrast medium by withdrawing the click syringe plunger then removing the retentive end/expanding or regular injection stent out of the osteotomy, a dental suction tip along with saline rinsing can be used after the contrast medium's removal to ensure the complete removal of the contrast medium.

16. The method of claim 15, further comprising the following step prior to suctioning the injected contrast medium:

l) tilting the operated person's head forward or backward and taking a second plain radiograph to allow the capture of the change in the shape or position of the radio-opacity, a change in its shape/position indicates a perforation and no change in the shape of the radio-opacity while maintaining the convexity indicates a successful maxillary sinus mucosa lifting.

17. A method of using the apparatus as claimed in claim 1 for elevating a maxillary sinus mucosa, in humans or in animals, and for determining whether said mucosa dissection and elevation is successful or if the mucosa is perforated during the process of sinus mucosa lifting prior to the application of any bone graft material or prior to implant placement, in a scenario of a multiple missing posterior teeth on the same side of the maxilla, comprising the steps of:

a) establishing access to a maxillary sinus mucosa through a first osteotomy in the maxillary bone;

b) selecting a retentive end that corresponds to that of the prepared osteotomy;

c) securing the selected retentive end around a hollow regular injection stent;

d) connecting the click syringe containing a contrast medium to the tube;

e) connecting the selected retentive end/hollow regular injection stent as an assembly to the click syringe/tube;

f) securing the retentive end/hollow regular injection stent assembly into the osteotomy by pressing and advancing said assembly into the osteotomy elastically deforming the retentive end to conform to the inner walls of the osteotomy;

g) optionally replacing the hollow regular injection stent with hollow expanding injection stent in combination with the same retentive end as a new assembly, the new assembly is then placed into the osteotomy and an inner element of the expanding injection stent is turned clockwise to provide a tight fit;

h) advancing the click syringe's plunger into its barrel to inject contrast medium through the tube and the retentive end/hollow regular or expanding injection stent, a seal provided by a friction fit of the retentive end against the osteotomy walls prevents the contrast medium from flowing out of the created space and transforms pressure applied on the plunger into hydraulic pressure onto the maxillary sinus membrane, leading to the dissection and elevation of the maxillary sinus mucosa and creating an artificial space, movement of the plunger provides sensory and auditory feedback to the operator with every predetermined volume injected, the operator stops injecting once a determined volume is reached;

i) taking a first plain radiograph of the operated site in the maxilla producing a first two-dimensional image, j) examining the first image to identify either a well defined shape having convex radio-opacity with a dome-like, semilunar, or balloon like shape on the floor of the maxillary sinus which is indicative of success or an ill defined mostly flat radio-opacity within the maxillary sinus imitating the shape of stagnating fluid against the sinus floor or its anterior/posterior wall indicative that the sinus mucosa is perforated;

k) suctioning the injected contrast medium by withdrawing the click syringe plunger;

l) removing the retentive end/hollow regular or expanding injection stent assembly out of the osteotomy;

m) establishing access to the maxillary sinus mucosa through a second osteotomy in the maxillary bone;

n) selecting a conical plug or expanding plug, that corresponds to the size of the first osteotomy;

o) securing the selected plug into the first osteotomy by pressing and advancing said plug into the osteotomy elastically deforming the plug to conform to the inner walls of the osteotomy providing a seal;

p) selecting a retentive end that corresponds to that of the second osteotomy;

q) securing the selected retentive end around a hollow regular or hollow expanding injection stent as an assembly;

r) connecting the click syringe containing a contrast medium to the tube;

s) connecting the selected retentive end/hollow regular or expanding injection stent assembly to the click syringe/tube;

t) securing the retentive end/hollow regular or expanding injection stent assembly into the osteotomy by pressing and advancing said assembly into the osteotomy elastically deforming the retentive end to conform to the inner walls of the osteotomy;

u) advancing the click syringe's plunger into its barrel to inject contrast medium through the tube and the retentive end/hollow regular or expanding injection stent assembly, leading to the dissection and elevation of a portion of the maxillary sinus mucosa corresponding to the second osteotomy and creating an additional artificial space that merges with the previously created space, the operator stops injecting once a determined volume is reached;

v) taking a second plain radiograph of the operated site in the maxilla producing a second two-dimensional image, w) examining the second image to identify either a well defined shape having convex radio-opacity with a dome-like, semilunar, or balloon like shape on the floor of the maxillary sinus which is indicative of success or an ill defined mostly flat radio-opacity within the maxillary sinus imitating the shape of stagnating fluid against the sinus floor or its anterior/posterior wall indicative that the sinus mucosa is perforated;

x) suctioning the injected contrast medium by withdrawing the click syringe plunger;

y) removing the retentive end/hollow regular or expanding injection stent assembly out of the second osteotomy.

* * * * *